US010597866B2

(12) United States Patent
Chadwell

(10) Patent No.: US 10,597,866 B2
(45) Date of Patent: *Mar. 24, 2020

(54) PANEL ASSEMBLIES AND METHODS TO ASSEMBLE THE SAME

(71) Applicant: Harper Engineering Co., Renton, WA (US)

(72) Inventor: David Chadwell, Renton, WA (US)

(73) Assignee: HARPER ENGINEERING CO., Renton, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/390,414

(22) Filed: Apr. 22, 2019

(65) Prior Publication Data

US 2019/0249416 A1    Aug. 15, 2019

Related U.S. Application Data

(63) Continuation of application No. 15/843,429, filed on Dec. 15, 2017, now Pat. No. 10,309,098.

(Continued)

(51) Int. Cl.
*F16B 5/01* (2006.01)
*E04B 1/41* (2006.01)
(Continued)

(52) U.S. Cl.
CPC ............... *E04B 1/40* (2013.01); *E04C 2/365* (2013.01); *F16B 5/01* (2013.01); *F16B 5/0291* (2013.01); *F16B 37/002* (2013.01); *B64C 1/066* (2013.01)

(58) Field of Classification Search
CPC .. E04B 1/40; F16B 5/01; F16B 37/002; F16B 5/0291; E04C 2/365; B64C 1/066
See application file for complete search history.

(56) References Cited

U.S. PATENT DOCUMENTS 3,842,486 A    10/1974 Gerard
4,272,930 A     6/1981 Foster
(Continued)

FOREIGN PATENT DOCUMENTS

CA    2 700 709 A1    4/2009
CN    204104903 U     1/2015
(Continued)

OTHER PUBLICATIONS

International Search Report and Written Opinion for PCT/US2017/066643, dated Mar. 19, 2018, 12 pages.

(Continued)

*Primary Examiner* — Patrick J Maestri
(74) *Attorney, Agent, or Firm* — Seed Intellectual Property Law Group LLP

(57) ABSTRACT

A panel assembly can include a first panel having a peripheral side located between an upper and a lower surface of the first panel and a first opening. The panel assembly can also include a second panel having a second opening. An elongated insert can be coupled to the first panel, the elongated insert having a coupling side, where the first opening of the first panel can be sized and shaped to coupleably receive the elongated insert such that the coupling side is positioned proximal to the peripheral side. The panel assembly can also include a fastening insert, where the second opening of the second panel can be sized and shaped to receive the fastening insert. A fastener can be received by the fastening insert and the elongated insert, the fastener coupling the first panel to the second panel via the fastening insert and the elongated insert. Related methods for assembling the panel assembly are also provided.

15 Claims, 32 Drawing Sheets

Related U.S. Application Data

(60) Provisional application No. 62/501,565, filed on May 4, 2017, provisional application No. 62/445,644, filed on Jan. 12, 2017.

(51) Int. Cl.
 *E04C 2/36* (2006.01)
 *F16B 5/02* (2006.01)
 *F16B 37/00* (2006.01)
 *B64C 1/06* (2006.01)

(56) References Cited

U.S. PATENT DOCUMENTS

| | | |
|---|---|---|
| 4,326,365 A | 4/1982 | Svensson |
| 4,898,756 A * | 2/1990 | Oefner ............... F16B 5/01 138/109 |
| 4,902,180 A | 2/1990 | Gauron |
| 4,916,882 A | 4/1990 | Brochard et al. |
| 4,971,496 A | 11/1990 | Scholz |
| 5,324,146 A | 6/1994 | Parenti et al. |
| D411,629 S | 6/1999 | Mandell |
| 6,598,363 B1 | 7/2003 | Ferguson et al. |
| D530,835 S | 10/2006 | Rosine et al. |
| 7,614,199 B2 | 11/2009 | Smalley, III |
| 8,707,634 B2 | 4/2014 | Anklam |
| 8,745,931 B2 | 6/2014 | Hutter |
| 9,109,615 B2 | 8/2015 | Cuddy et al. |
| 2006/0048459 A1 | 3/2006 | Moore |
| 2008/0170928 A1 | 7/2008 | Stadler et al. |
| 2014/0202615 A1 | 7/2014 | Cuddy et al. |
| 2017/0121961 A1 | 5/2017 | Hodson et al. |

FOREIGN PATENT DOCUMENTS

| | | |
|---|---|---|
| DE | 195 17 785 A1 | 11/1996 |
| DE | 20 2009 000 019 U1 | 6/2010 |
| EP | 2226516 A1 | 9/2010 |

OTHER PUBLICATIONS

International Preliminary Report on Patentability for PCT/US2017/066643, dated Jul. 25, 2019. 8 pages.

* cited by examiner

PANEL ASSEMBLIES AND METHODS TO ASSEMBLE THE SAME

BACKGROUND

Technical Field

This application is generally related to panel inserts and, more particularly, to panel insert assemblies.

Description of the Related Art

Composite panels generally provide strength and durability benefits, reduce weight, and tend to reduce maintenance costs typically associated with metal structures. Typical examples of composite panels can include carbon-fiber reinforced plastic (CFRP) panels, honeycomb panels, or other panels having a composite of a resin matrix and sheets embedded in the matrix. While composite panels provide benefits, assembling composite panels has been problematic. For example, typical methods of assembling composite panels have involved using a tab and slot arrangement, where a first panel includes a tab extending from an edge that is coupled to a slot included on a second panel. Other methods of assembling composite panels have involved orienting panels perpendicularly to each other and having fasteners extending through a panel edge to couple them together, or having an angle bracket, e.g., L-shaped bracket, coupled to inside faces of the panels and fastened to the panels.

Such methods of coupling composite panels, however, limit or restrict opportunities to disassemble the panels post-coupling, as disassembling the panels can lead to damage to the components used to assemble the panels. Further, the restriction or limitation of disassembling the panels post-coupling prevents finishing the panels, i.e., applying decorative finishes, prior to the assembly. Still further, the hardware required to assemble the panels adds avoidable weight, results in costly and complex manufacturing and/or assembly fixtures, and results in unsightly or aesthetically unpleasant components.

BRIEF SUMMARY

In various implementations, panel assemblies and components thereof, and related methods to assemble the same with robust, compact, and efficient form factors enable ease of assembly/disassembly of panels that can be used to construct various components and structures. Further the various implementations described herein improve aesthetic appeal and reduce the weight footprint of the various components and structures that can be constructed via the various implementations of panel assemblies and components thereof described herein. For example, in one non-limiting implementation, a panel assembly can be summarized as a first panel having a peripheral side located between an upper and a lower surface of the first panel, and a first opening; and a second panel having a second opening. The panel assembly can include an elongated insert having a coupling side, where the first opening of the first panel is sized and shaped to coupleably receive the elongated insert such that the coupling side is positioned proximal to the peripheral side; and a fastening insert, where the second opening of the second panel is sized and shaped to receive the fastening insert. The panel assembly can include a fastener received by the fastening insert and the elongated insert, the fastener coupling the first panel to the second panel via the fastening insert and the elongated insert.

For example, in another non-limiting implementation, a method of assembling a panel assembly can be summarized as including coupling an elongated insert to a peripheral side of a first panel; coupling a fastening insert to a second panel; and coupling the first panel to the second panel via a fastener which extends through the elongated insert and the fastening insert.

DETAILED DESCRIPTION

In the following description, certain specific details are set forth in order to provide a thorough understanding of various disclosed embodiments. One skilled in the relevant art will recognize that embodiments may be practiced without one or more of these specific details. In other instances, well-known structures and devices associated with panel assemblies and related apparatuses, systems, and methods may not be shown or described in detail to avoid unnecessarily obscuring descriptions of the embodiments.

Unless the context requires otherwise, throughout the specification and claims which follow, the word "comprise" and variations thereof, such as "comprises" and "comprising," are to be construed in an open, inclusive sense, that is, as "including, but not limited to."

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementation.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Figure 1:
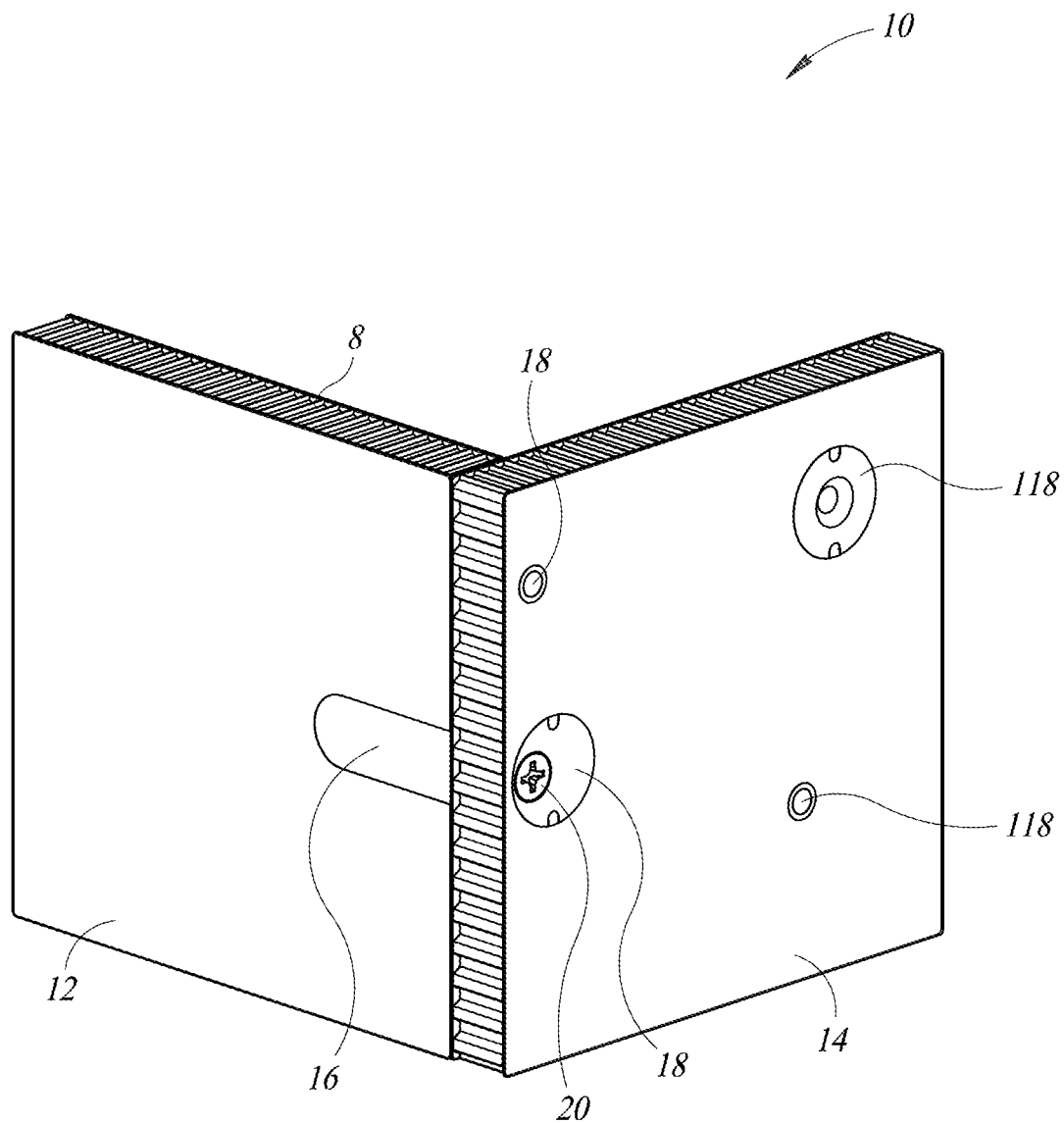
FIG. 1 is a perspective of a panel assembly, according to one example implementation.
Figure 2:
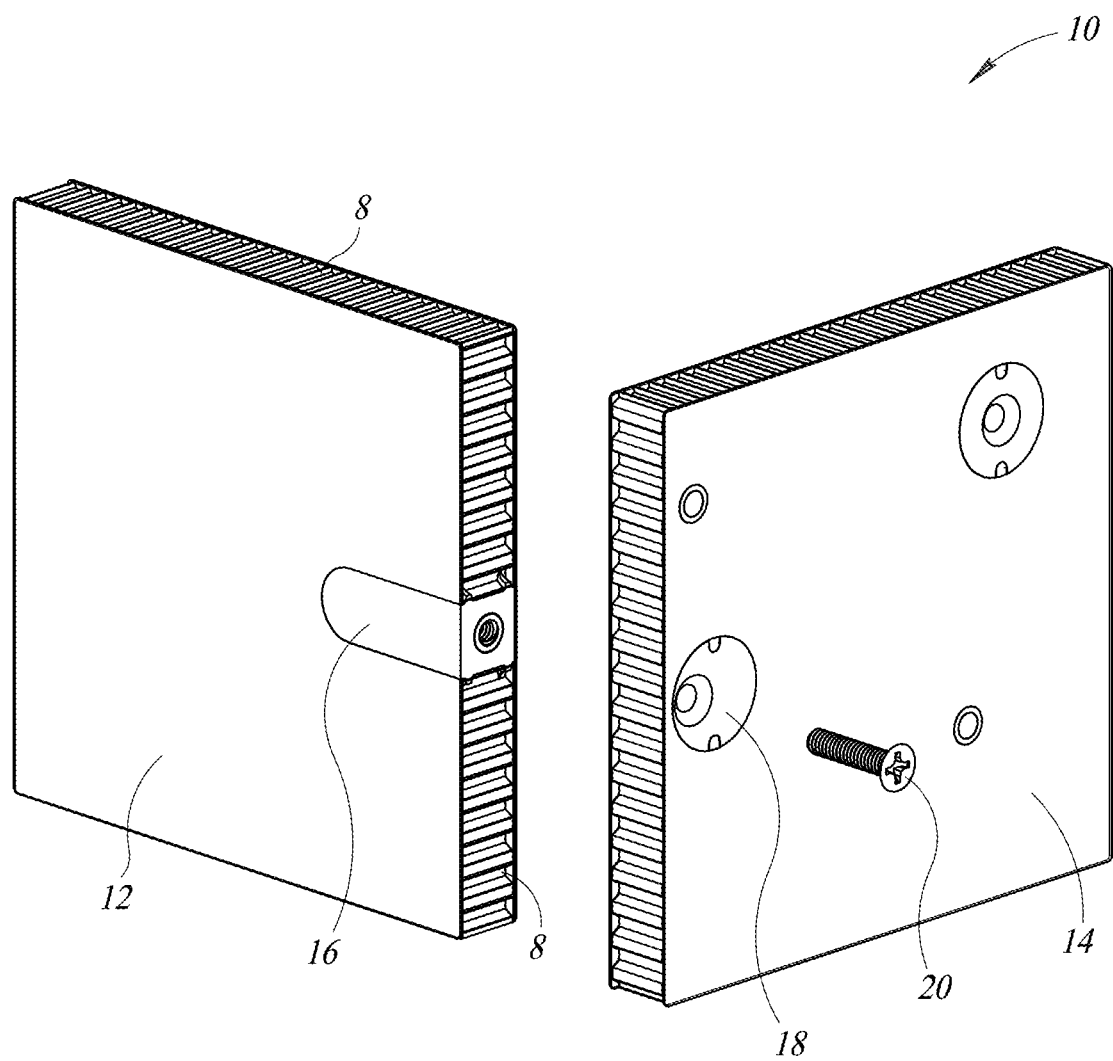
FIG. 2 is a partially exploded view of the panel assembly of FIG. 1.
Figure 3:
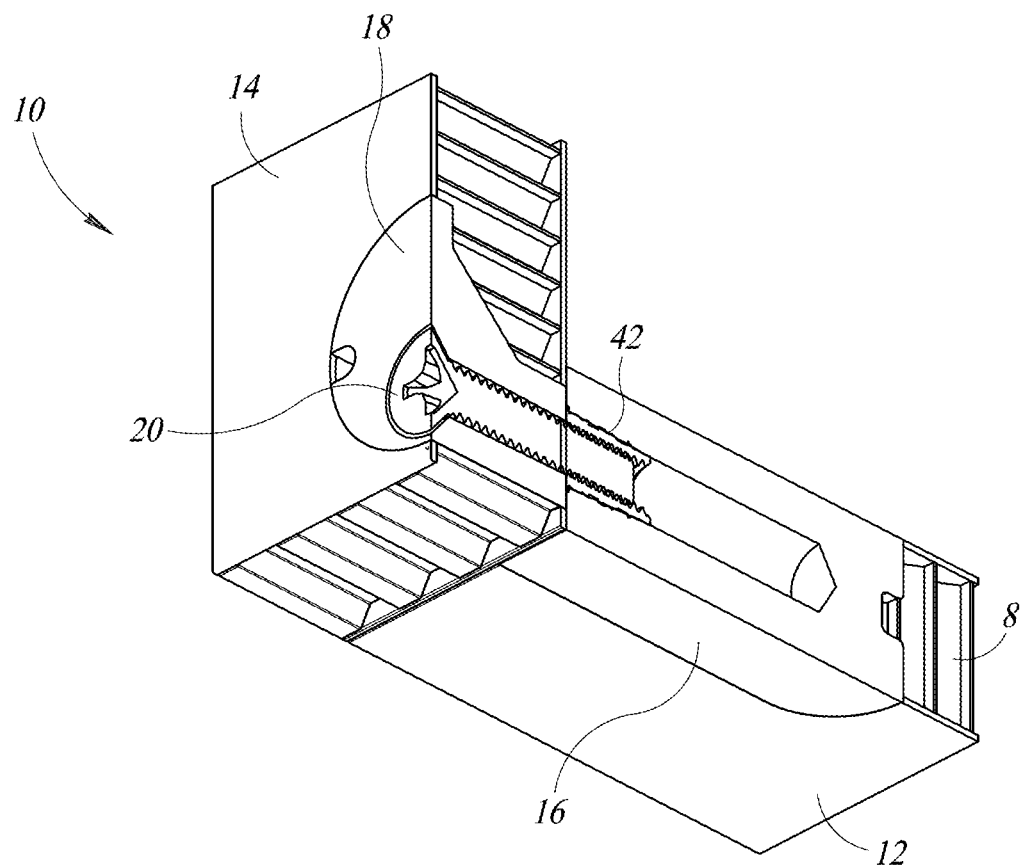
FIG. 3 is a partial cutaway view of the panel assembly of FIG. 1, taken along line 3-3.

FIGS. 1-3 illustrate a panel assembly 10, according to one example implementation. The panel assembly 10 includes a first panel 12 and a second panel 14 coupled to the first panel 12. The first panel 12 includes an elongated insert 16, according to one example implementation, and the second panel 14 includes a fastening insert 18, according to one example implementation. The first panel 12 is coupled to the second panel 14 via a fastener 20, e.g., screw, bolt, etc., which is inserted through the fastening insert 18 and couples to the elongated insert 16.

The first and second panels 12, 14 are generally composite panels. For example, FIGS. 1-3 illustrate a honeycomb panel. The honeycomb panel generally includes a pair of face sheets, typically comprising metallic structures or fiber-reinforced thermosetting or thermoplastic composite structures, coupled to, and sandwiching, a honeycomb core. In other implementations, however, the first and second panels 12, 14 can comprise other composite structures, such as, for example, CFRP panels, or other panels having a composite of a resin matrix and sheets embedded in the matrix. As illustrated in FIGS. 1-3, the first and second panels 12, 14 are removably coupled to each other via the elongated insert 16, the fastening insert 18, and the fastener 20. Assembling the first and second panels 12, 14 in this manner, advantageously, allows the panels (e.g., first and second panels 12, 14) to be disassembled with relative ease, reduces the weight footprint, avoids damaging the panels caused during disassembly of permanently coupled panels, e.g., via fasteners extending directly through edges or positioned proximal to edges of the panels, and avoids use of unattractive attaching structures, such as the tab, slot arrangement of prior designs. Further, the ease of assembly/disassembly permits finishing the panels prior to assembly.

By way of example, as described above, the first panel 12 and the second panel 14 can be assembled with relative ease by removably coupling each other via the elongated insert 16, the fastening insert 18, and the fastener 20. Thus, the first panel 12 can be uncoupled by removing the fastener 20, which permits the first panel 12 and/or the second panel 14 to be reused without damaging either the first panel 12 or the second panel 14 during disassembly. By way of further example, assembling the panel assembly 10 in this manner can facilitate positioning, aligning, and/or repositioning any attaching panel, e.g., second panel 14, by locating the fastening insert 18 anywhere within a boundary of the attaching panel, e.g., second panel 14. By way of further example, assembling the panel assembly 10 according to the various implementations described herein can improve the aesthetic appearance of panel assemblies. For instance, as illustrated in FIGS. 1-3, the external surfaces of the elongated insert 16 are substantially flush with external surfaces of the first panel 12, and top and bottom surfaces of the fastening insert 18 are substantially flush with external surfaces of the second panel 14. In this manner, the panel assembly 10 provides an aesthetically pleasing view, along with the other improvements discussed above.

Figure 4A:
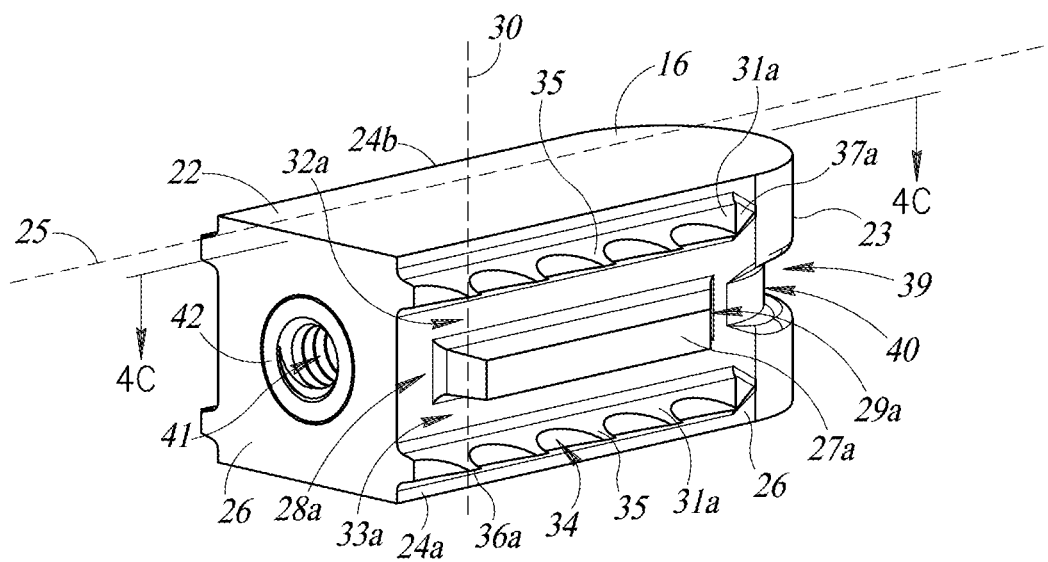
FIG. 4A is a perspective view of an elongated insert, according to one example implementation.
Figure 4B:
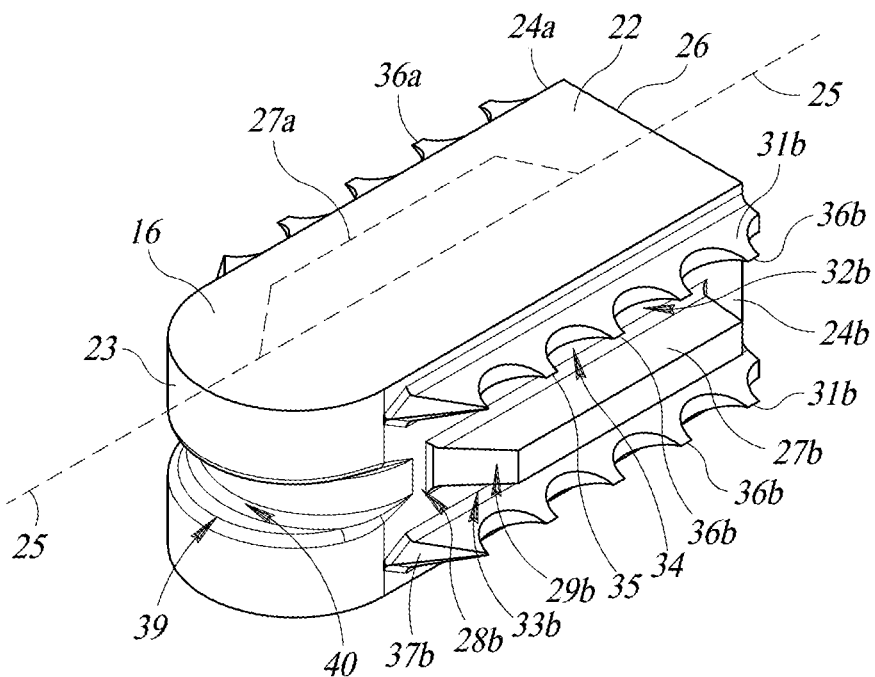
FIG. 4B is another perspective view of the elongated insert of FIG. 4A.
Figure 4C:
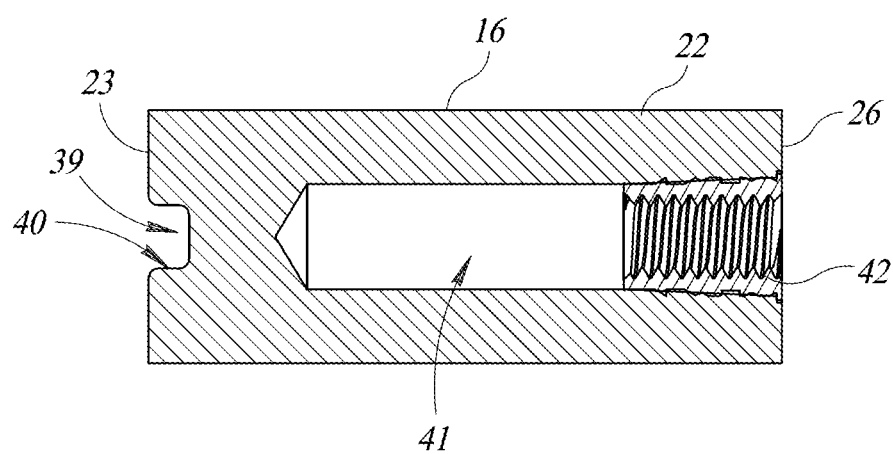
FIG. 4C is a cross-sectional view of the elongated insert of FIG. 4A, taken along line 4C-4C.

FIGS. 4A-C illustrates the elongated insert 16 that is coupled to the first panel 12. In some implementations, the elongated insert 16 can comprise metallic structures, such as aluminum, titanium, steel, etc. In such implementations, the metallic structures can be fabricated via machining, casting, or other suitable processes and methods. In other implementations, the elongated insert 16 can comprise plastic materials, such as various polyamides, including Torlon, IXEF, etc. In such implementations, the elongated insert 16 can be made via injection molding, or other suitable processes and methods. The elongated insert 16 includes a main body 22 which has a generally rectangular shape with a front side 23 that has a generally arcuate shape. In other implementations, however, the elongated insert 16 may have other shapes and configurations, such as square, cylindrical, elliptical, etc. The main body 22 includes a pair of sides 24a, 24b which are a mirror image of each other with respect to a longitudinal central axis 25. The main body 22 also includes a back side 26 that is located at an opposite end of the front side 23.

At each side 24a, 24b, the main body 22 includes core pusher members 27a, 27b that protrude outwardly from corresponding side surfaces 28a, 28b. Each core pusher member 27a, 27b is generally rectangularly shaped and includes corresponding front surfaces 29a, 29b that are oriented to angularly extend relative to a vertical axis 30 of the main body 22. Each core pusher member 27a, 27b is centrally located relative to a pair of corresponding cutting members 31a, 31b. In particular, one of the pair of cutting members 31a, 31b is located above the corresponding core pusher members 27a, 27b to define corresponding first flow regions 32a, 32b and the other of the pair of cutting members 31a, 31b is located below the corresponding core pusher members 27a, 27b to define corresponding second flow regions 33a, 33b.

Each cutter member 31a, 31b protrudes outwardly relative to the corresponding side surfaces 28a, 28b and includes a plurality of apertures 34 which define a plurality of teeth 35. In particular, upper surfaces and lower surfaces of each cutter member 31a, 31b protrude outwardly from the corresponding side surfaces 28a, 28b and taper inwardly to define corresponding sharp edges. In this manner, the plurality of apertures 34, the taper and protrusion define substantially serrated edges 36a, 36b on each side of the elongated insert 16. At a front end, each cutter member 31a, 31b includes corresponding cutting edges 37a, 37b. Each cutting edge 37a, 37b is defined by a generally prism-shaped surface, having an edge that extends angularly relative to the vertical axis 30 of the main body 22. Although the cutting edges 37a, 37b in this implementation include a generally prism-shaped surface, in other implementations, however, the cutting edges 37a, 37b may include other shaped surfaces that are capable of having a generally sharp edge to cut through various panels, as described in more detail below.

As described above, the front side 23 of the main body 22 has a generally arcuate shape. The front side 23 includes a recess 39 which at least partially extends through the front side 23 to define a front flow region 40. The back side 26 of the main body 22 includes an insert aperture 41 that at least partially extends through the main body 22 in a longitudinal direction, e.g., along the longitudinal central axis 25. The insert aperture 41 is sized and shaped to optionally coupleably receive a threaded insert 42. In some implementations, the threaded insert 42 can be coupled to the main body 22 via a press-fit connection, where an outer diameter of the threaded insert 42 is sized and shaped to be less than a diameter of the insert aperture 41, thus coupling the threaded insert 42 to the main body 22 via frictional forces. In other implementations, however, the threaded insert 42 can be coupled to the main body 22 via welding, fastening, adhering, or other suitable coupling structures. As illustrated in FIGS. 4A-4C, the threaded insert 42 is generally hollow and includes a plurality of threads. The plurality of threads are sized and shaped to coupleably receive the fastener 20 which couples the first panel 12 to the second panel 14. Still further, in some implementations, the threaded insert 42 can be omitted. In such implementations, the insert aperture 41 can be sized and shaped to include threaded structures that couple to the fastener 20, e.g., tapped apertures, blind fasteners, etc.

Figure 5A:
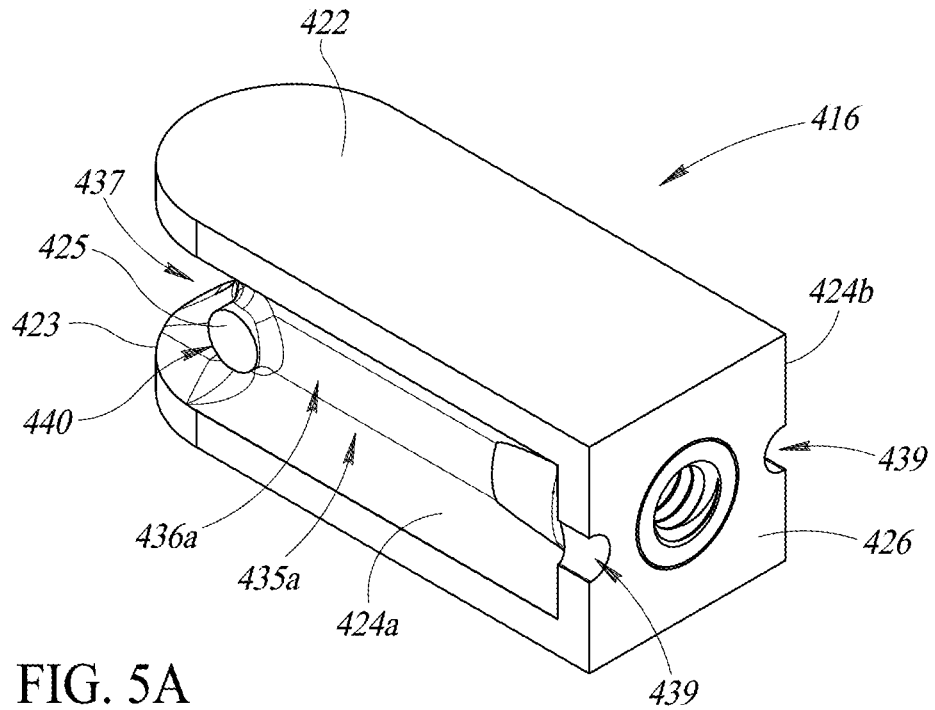
FIG. 5A is a perspective view of an elongated insert, according to one example implementation.
Figure 5B:
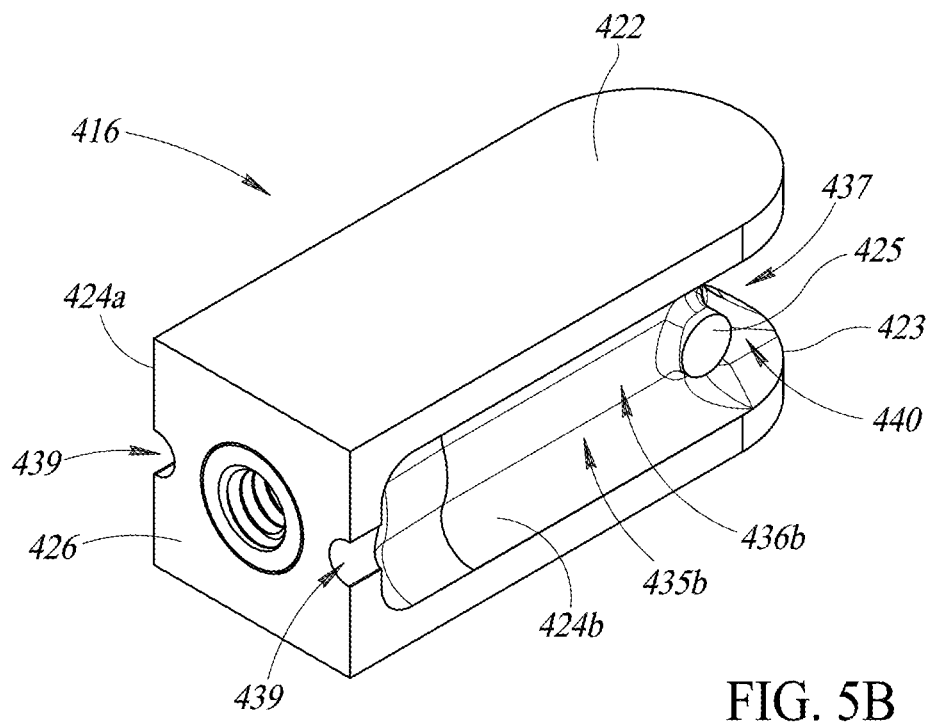
FIG. 5B is another perspective of the elongated insert of FIG. 5A.

FIGS. 5A, 5B illustrates an elongated insert 416 according to another example implementation. The elongated insert 416 provides a variation in which the elongated insert 416 generally excludes or omits the core pusher members 27a, 27b and cutting members 31a, 31b. The elongated insert 416 includes a main body 422 having a pair of sides, 424a, 424b, a back side 426, and a front side 423. Each side 424a, 424b includes a corresponding recess 435a, 435b extending partially through the main body 422 to define corresponding side flow regions 436a, 436b. In some implementations, each side 424a, 424b can include a boss element 425 which extends or protrudes outwardly from a corresponding side surface. The boss element 425 is generally sized and shaped to strengthen a joint formed with the elongated insert 416 and the panel the elongated insert 416 is coupled to. For instance, the boss element 425, post-coupling, resists decoupling of the elongated insert 416, as removal would require overcoming the shear forces of the joint formed between the panel and the elongated insert 416.

The front side 423 includes a front recess 437 extending partially through the front side 423 to define a front flow region 440. The side flow regions 436a, 436b and the front flow region 440 collectively define a flow region or path for a potting compound to flow around the elongated insert 416 to couple or bond the elongated insert 416 to a panel, e.g., first panel 12, second panel 14, etc. In particular, the back side 426 includes a pair of apertures 439 extending therethrough, which are sized and shaped to allow the potting compound to be applied to the elongated insert 416 inserted into a panel, e.g., first panel 12, second panel 14, etc., and are generally aligned with the corresponding side flow regions 436a, 436b to allow the potting compound to be applied.

Figure 6A:
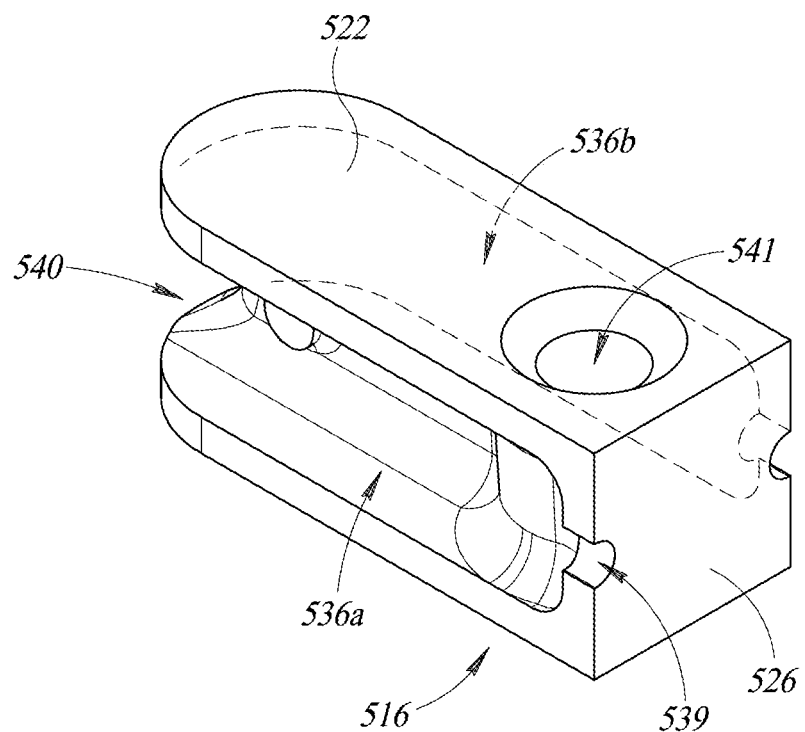
FIG. 6A is a perspective view of an elongated insert, according to one example implementation.

FIG. 6A illustrates an elongated insert 516 according to another example implementation. The elongated insert 516 is generally similar to the elongated insert 416 but provides a variation in which an insert aperture 541 extends through a main body 522, in lieu of an insert aperture and/or a threaded insert extending through a back side, e.g., back side 426. Again, the elongated insert 516 includes a pair of apertures 539 extending through a back side 526 of the elongated insert 516. As illustrated in FIG. 6A, the elongated insert 616 also includes a front flow region 540 and side flow regions 536a, 536b.

Figure 6B:
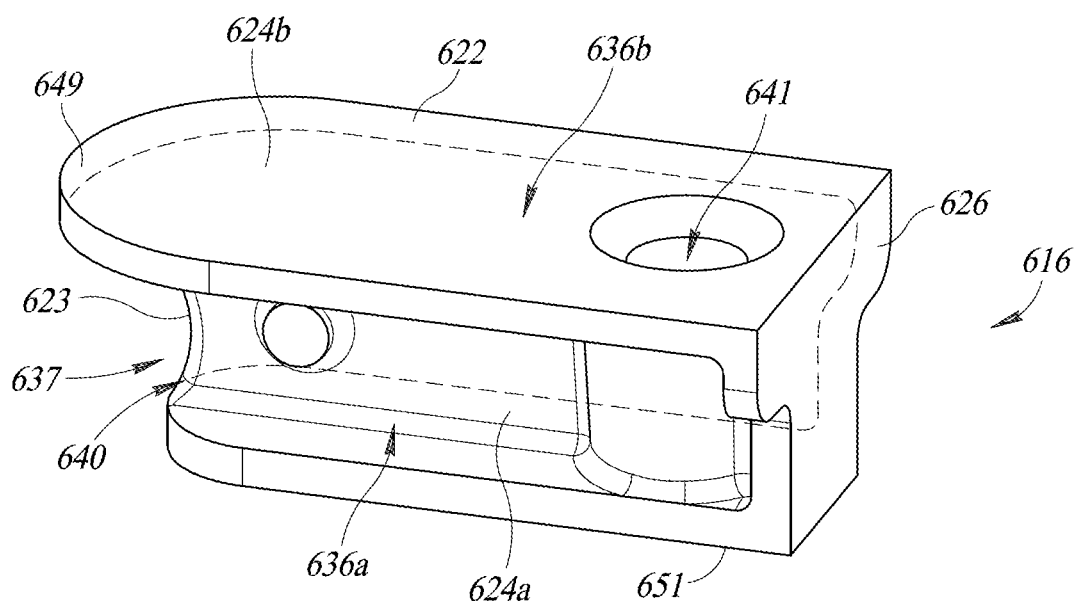
FIG. 6B is a perspective view of an elongated insert, according to one example implementation.

FIG. 6B illustrates an elongated insert 616 according to another example implementation. The elongated insert 616 is generally similar to the elongated insert 516 but provides a variation in which a main body 622 includes recesses 636a, 636b disposed in corresponding sides 624a, 624b and extending through a substantially T-shaped back side 626, and a front recess 637 disposed on a front side 623 that define an upper flange 649 and a lower flange 651. The upper flange 649 extends beyond the lower flange 651 to define side flow regions 636a, 636b and front flow region 640. In this implementation, the side flow regions 636a, 636b and the front flow region 640 are advantageously sized and shaped to selectively allow an increased surface area to adhere to a corresponding panel to which the elongated insert 616 is coupled. Again, as illustrated in FIG. 6B, an insert aperture 641 extends through the main body 622, in particular, through the upper flange 649 and the lower flange 651.

Figure 6C:
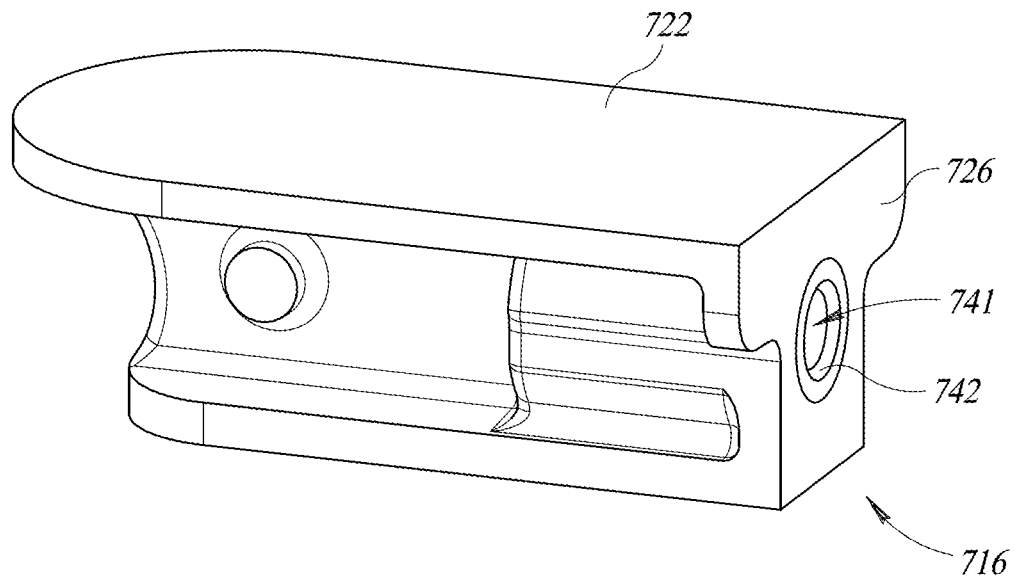
FIG. 6C is a perspective view of an elongated insert, according to one example implementation.

FIG. 6C illustrates an elongated insert 716 according to another example implementation. The elongated insert 716 is generally similar to the elongated insert 616, but provides a variation in which a main body 722 includes a back side 726 having an insert aperture 741. The insert aperture 741 extends partially through the main body 722 via the back side 726. Again, a threaded insert 742 can be coupled to the main body 722 via the insert aperture 741.

Figure 6D:
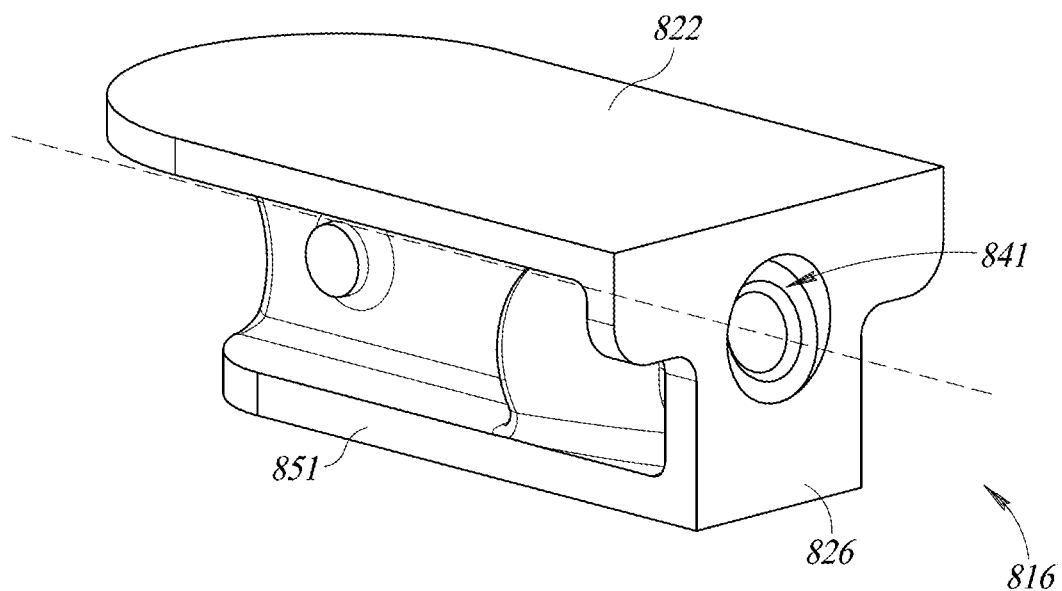
FIG. 6D is a perspective view of an elongated insert, according to one example implementation.
Figure 6E:
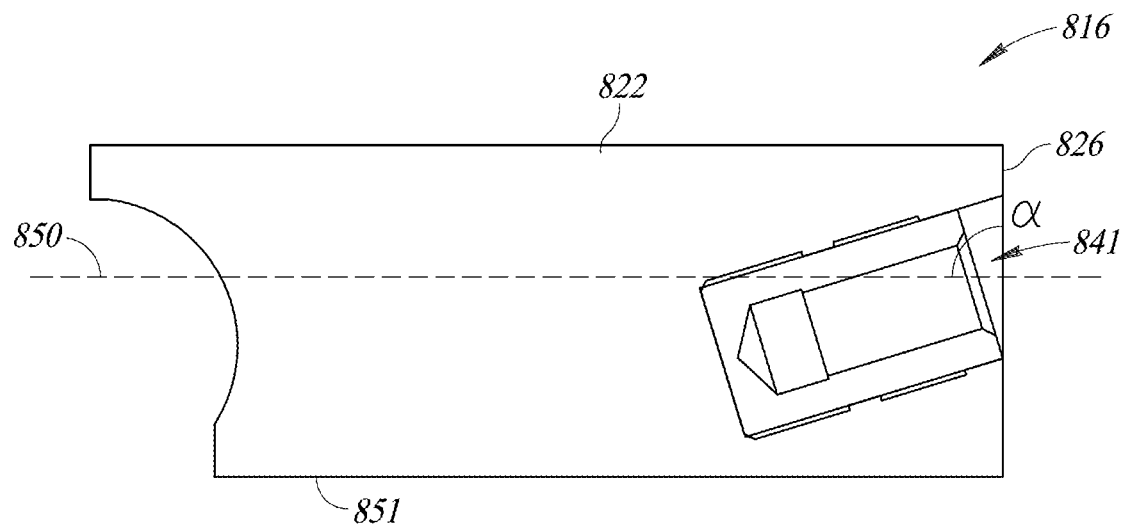
FIG. 6E is a cross-sectional view of the elongated insert of FIG. 6D, taken along a central plane of the elongated insert.

FIGS. 6D-6E illustrate an elongated insert 816 according to another example implementation. The elongated insert 816 is generally similar to the elongated insert 716, but provides a variation in which an insert aperture 841 extends through a main body 822 via a back side 826 at an angular orientation. In particular, as illustrated in FIG. 6E, the insert aperture 841 extends angularly relative to a central axis 850 toward a lower flange 851 of the elongated insert 816 at an angle α. In some implementations, the angle α can be in a range of about 15 to 20 degrees.

Figure 6F:
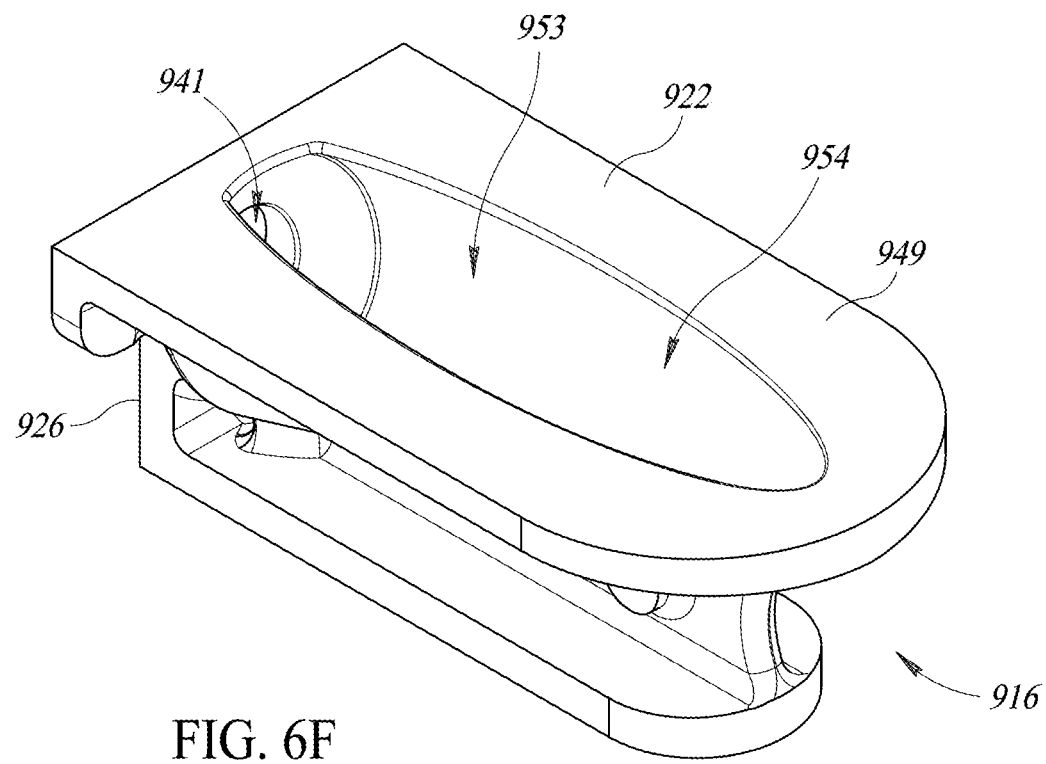
FIG. 6F is a perspective view of an elongated insert, according to one example implementation.
Figure 6G:
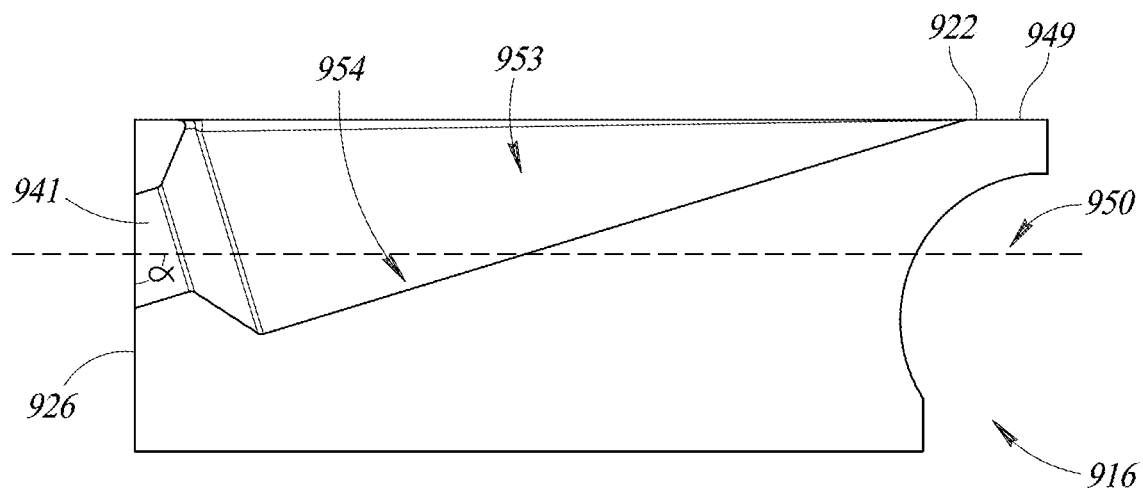
FIG. 6G is a cross-sectional view of the elongated insert of FIG. 6F, taken along a central plane of the elongated insert.

FIGS. 6F-6G illustrate an elongated insert 916 according to another example implementation. The elongated insert 916 is generally similar to the elongated insert 816, but provides a variation in which an insert aperture 941 extends through a main body 922 via a back side 926 at an angular orientation toward an upper flange 949 of the elongated insert 916. In particular, as illustrated in FIG. 6F, the upper flange 949 of the main body 922 includes a recess 953 that extends partially through the main body 922. The recess 953 generally has an eye-shape which defines a receiving surface 954 that extends angularly relative to a central axis 950 of the elongated insert 916. In this manner, the insert aperture 941 and the receiving surface 954 extend angularly relative to the central axis 950 at an angle α, where the insert aperture 941 and the receiving surface 954 are sized and shaped to allow a fastener to extend angularly relative to the central axis 950. Again, in some implementations, the angle α can be in a range of about 15 to 20 degrees.

Figure 6H:
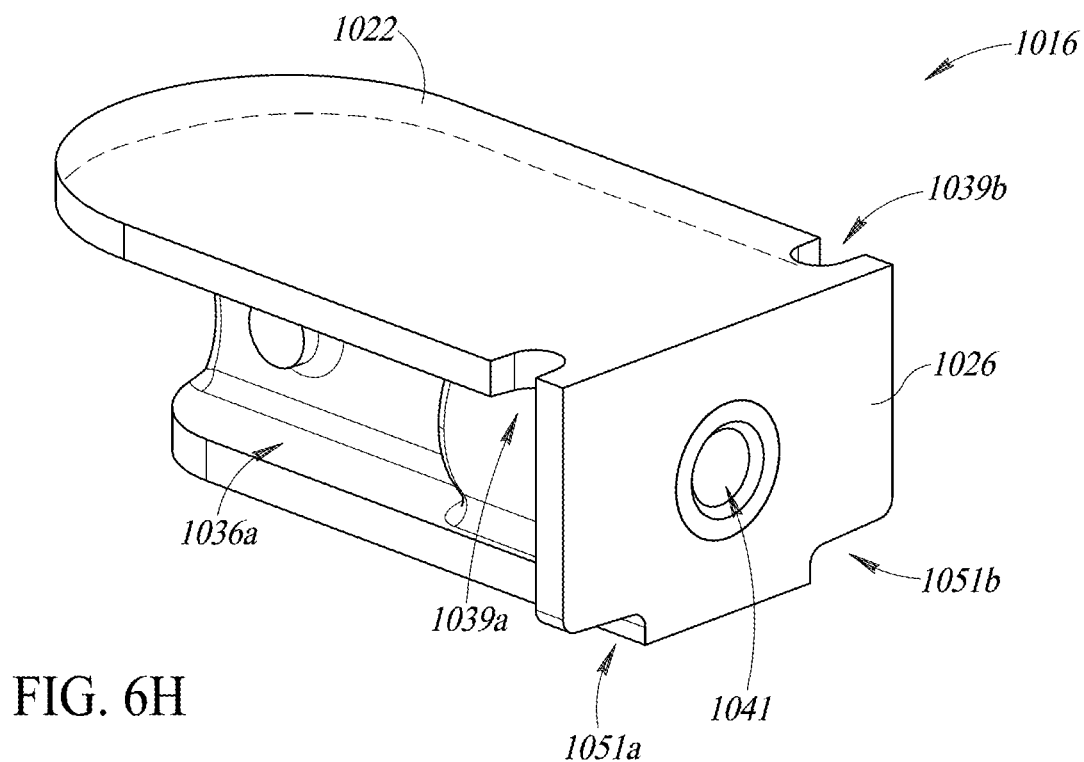
FIG. 6H is a perspective view of an elongated insert, according to one example implementation.
Figure 6I:
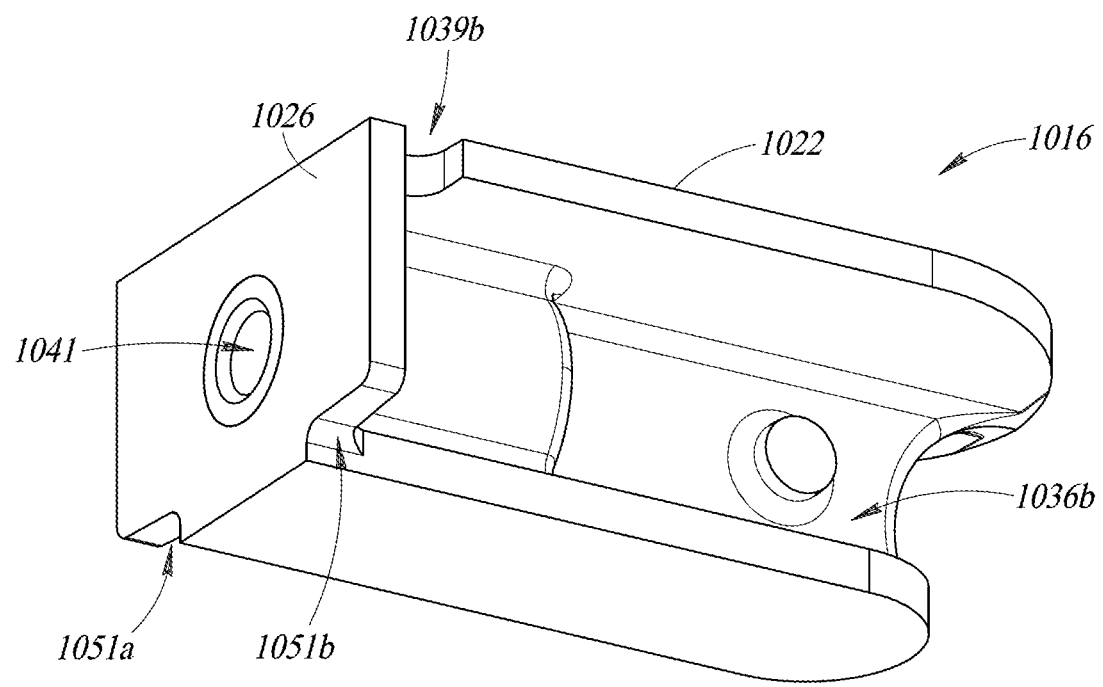
FIG. 6I is another perspective view of the elongated insert of FIG. 6H.

FIGS. 6H-6I illustrate an elongated insert 1016 according to another example implementation. The elongated insert 1016 is generally similar to the elongated insert 616, but provides certain variations. The elongated insert 1016 includes a main body 1022 that includes recesses 1036a, 1036b disposed in corresponding sides of the main body 1022. The main body 1022 includes a substantially rectangular-shaped back side 1026. The back side 1026 includes a pair of lower notches 1051a, 1051b. In general, the larger area of the back side 1026 is sized and shaped to provide extra material for retention of potting compound on a panel edge. The back side 1026 includes an insert aperture 1041 that extends partially through the main body 1022 via the back side 1026. In this implementation, the main body 1022 includes a pair of apertures 1039 extending therethrough, which are sized and shaped to allow the potting compound to be applied to the elongated insert 1016 inserted into a panel, e.g., first panel 12, second panel 14, etc. The pair of apertures 1039 are located proximal to the back side 1026, extending through a top side or upper flange of the main body 1022.

Figure 6J:
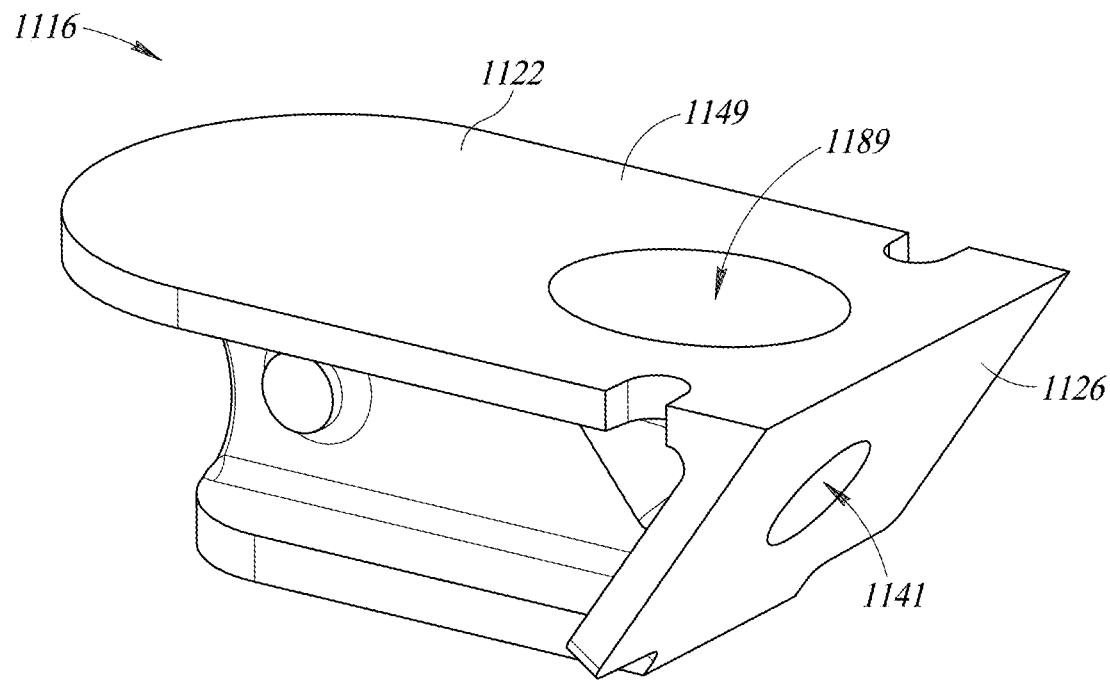
FIG. 6J is a perspective view of an elongated insert, according to one example implementation.
Figure 6K:
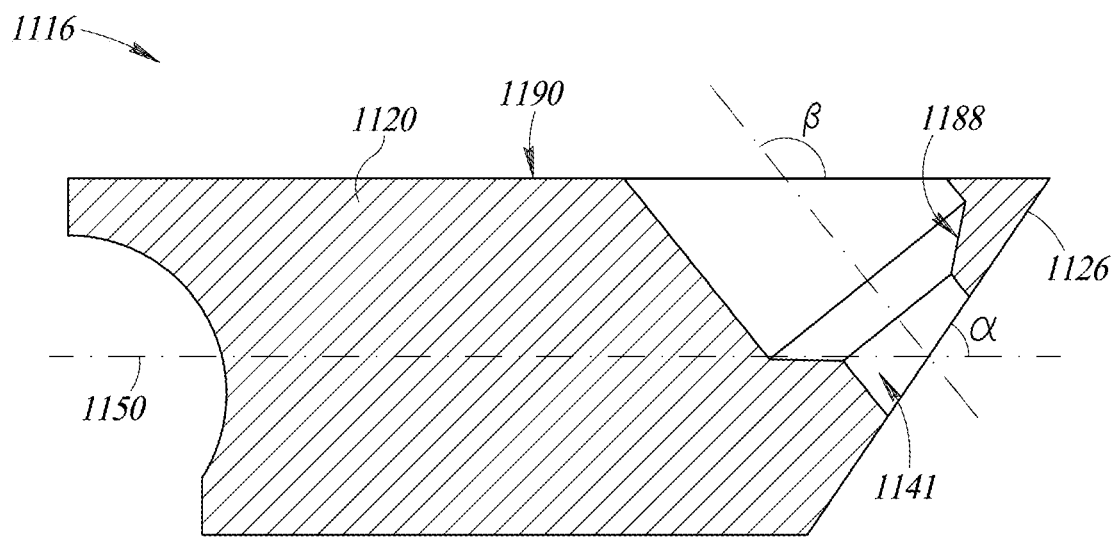
FIG. 6K is a cross-sectional view of the elongated insert of FIG. 6J, taken along a central plane of the elongated insert.

FIGS. 6J-6K illustrate an elongated insert 1116 according to another example implementation. The elongated insert 1116 is generally similar to the elongated insert 1016, but provides certain variations. In particular, the elongated insert 1116 includes a main body 1122 that includes an angular back side 1126. The angular back side 1126 extends in an angular orientation relative to a central axis 1150 of the elongated insert 1116. For example, in some implementations, the angular back side 1126 is angularly oriented relative to the central axis 1150 at an angle α. The angular orientation of the back side 1126 facilitates coupling first and second panels where one or both of the first and second panels may be oriented at an angular configuration. As such, the angle α can vary to accommodate the angular orientation of the first and/or second panels. The main body 1122 includes an insert aperture 1141 that extends through the back side 1126 and a top side or upper flange 1149 of the main body 1122. As illustrated in FIGS. 6J, 6K, the insert aperture 1141 is defined at least in part by a lip region 1188 and an elliptical shaped region 1189 that are angularly oriented relative to an upper surface 1190 of the top side or upper flange 1149 at an angle β. The lip region 1118 in some implementations may be sized and shaped to receive a head of a fastener that extends angularly to couple the first and/or second panels.

Figure 7A:
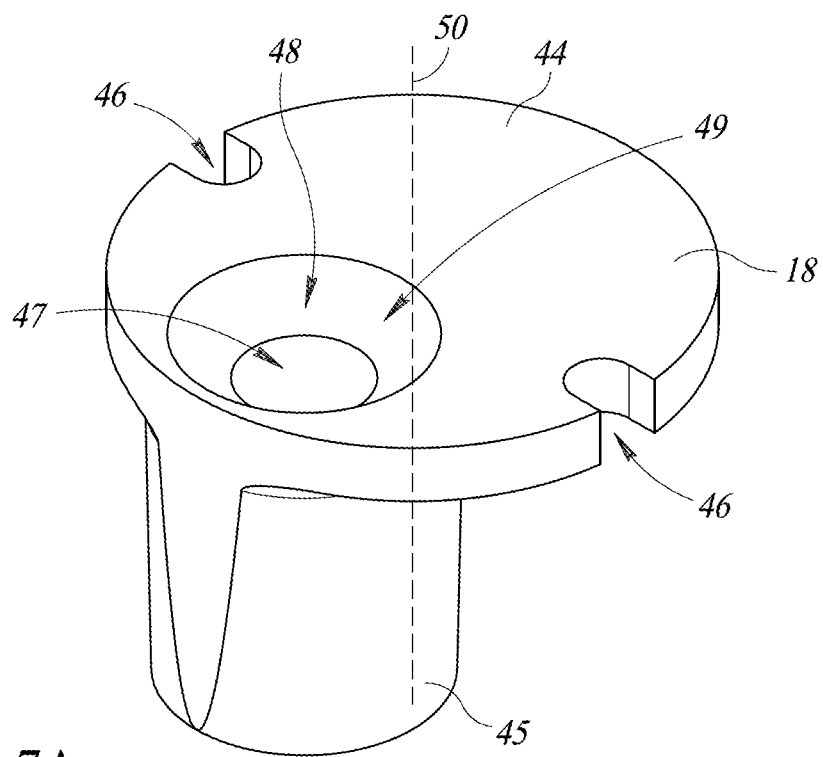
FIG. 7A is a top perspective view of a fastening insert, according to one example implementation.
Figure 7B:
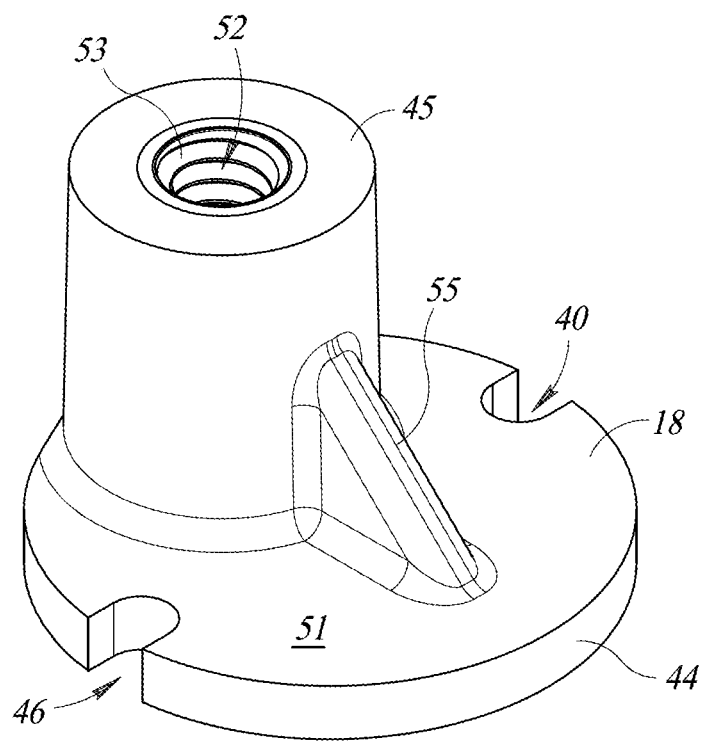
FIG. 7B is a bottom perspective view of the fastening insert of FIG. 7A.

FIGS. 7A-7B illustrate the fastening insert 18 that is coupled to the second panel 14. In some implementations, the fastening insert 18 can comprise metallic structures, such as aluminum, titanium, steel, etc. In such implementations, the metallic structures can be fabricated via machining, casting, or other suitable processes and methods. In other implementations, the fastening insert 18 can comprise plastic materials, such as various polyamides, including Torlon, IXEF, etc. The fastening insert 18 includes a cap portion 44 and a shaft portion 45. The cap portion 44 has a generally cylindrical shape and includes a pair of slots 46 extending therethrough and positioned proximal to a periphery of the cap portion 44. In some implementations, the cap portion 44 includes a fastener aperture 47 that extends through the cap portion 44. The fastener aperture 47 is surrounded by a neck down region 48 disposed in the cap portion 44 which is sized and shaped to provide a countersink 49. The countersink 49 is sized and shaped to receive a fastener, e.g., fastener 20, such that an exterior surface of the fastener sits substantially flush with an exterior surface of the cap portion 44 when the fastener is coupleably received by the fastening insert 18. In other implementations, however, the cap portion 44 can exclude a fastener aperture 47 and have a solid structure. In some implementations, as shown in FIGS. 7A-7B, the fastener aperture 47 is located at an offset relative to a central axis 50 of the fastening insert 18. Positioning the fastener aperture 47 at the offset advantageously provides positional flexibility during assembly of the panel assembly 10 as the fasteners, e.g., fastener 20, that couple the first panel 12 to the second panel 14 can be positioned proximal to the edges of the panels, e.g., second panel 14.

The shaft portion 45 extends outwardly from a lower surface 51 of the cap portion 44. The shaft portion 45 includes a shaft insert aperture 52 that extends through the shaft portion 45 to define a generally hollow structure of the shaft portion 45. The shaft insert aperture 52 is located in the shaft portion 45 to be substantially coaxial with the fastener aperture 47 of the cap portion 44. The shaft insert aperture 52 is sized and shaped to optionally coupleably receive a fastening threaded insert 53. In some implementations, the fastening threaded insert 53 can be coupled to the shaft portion 45 via a press-fit connection, where an outer diameter of the fastening threaded insert 53 is sized and shaped to be less than a diameter of the shaft insert aperture 52, thus coupling the fastening threaded insert 53 to the shaft portion 45 via frictional forces. In other implementations, however, the fastening threaded insert 53 can be coupled to the shaft portion 45 via welding, fastening, adhering, or other suitable coupling structures. Still further, in some implementations, the fastening threaded insert 53 can be omitted. In such implementations, the shaft insert aperture 52 can be sized and shaped to include threaded structures that couple to the fastener 20, e.g., tapped apertures, blind fasteners, etc., or the shaft insert aperture 52 can be a through hole, i.e., extending through the shaft portion 45. As illustrated in FIGS. 7A-7B, the fastening threaded insert 53 is generally hollow and includes a plurality of threads. The plurality of threads are sized and shaped to optionally coupleably receive the fastener 20 which couples the first panel 12 to the second panel 14.

Moreover, as illustrated in FIGS. 1-3, in some implementations, the fastening threaded insert 53 can be omitted and the fastener 20 can extend through the shaft insert aperture 52 and fasten to the threaded insert 42 of the elongated insert 16. In instances where the fastening insert 18 includes a fastening threaded insert 53, as illustrated in FIGS. 5A-5B, the fastener 20 can be threadedly received by the fastening threaded insert 53 of the fastening insert 18 and the threaded insert 42 of the elongated insert 16.

As illustrated in FIGS. 7A-7B, the fastening insert 18 also includes a rib portion 55. The rib portion 55 extends from an outer surface of the shaft portion 45 to the lower surface 51 of the cap portion 44. The rib portion 55 is generally sized and shaped to improve strength and stability of the fastening insert 18.

Figure 7C:
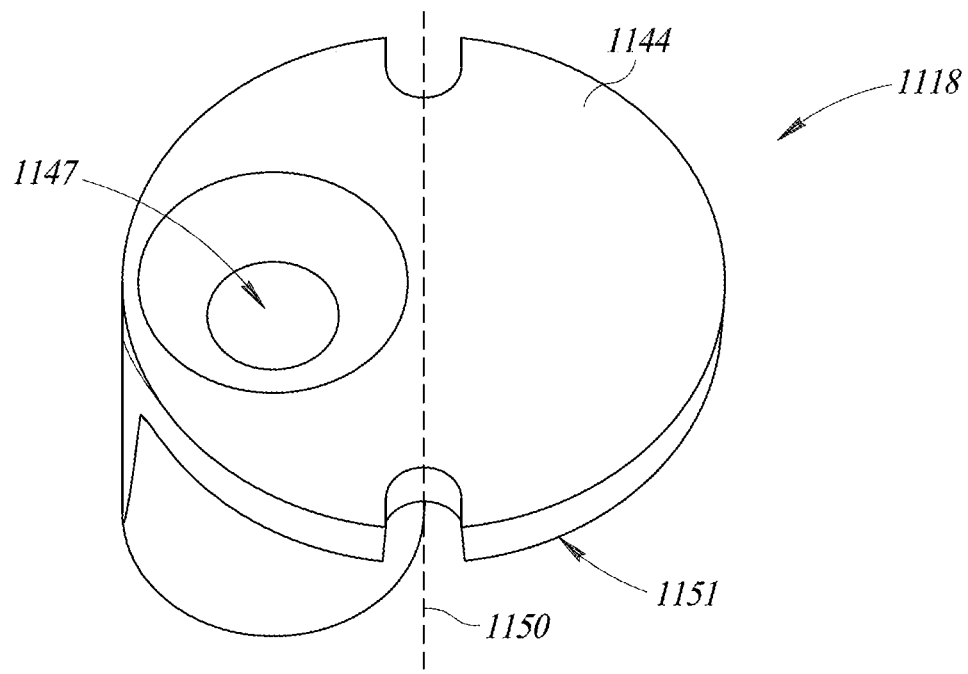
FIG. 7C is a top perspective view of a fastening insert, according to one example implementation.
Figure 7D:
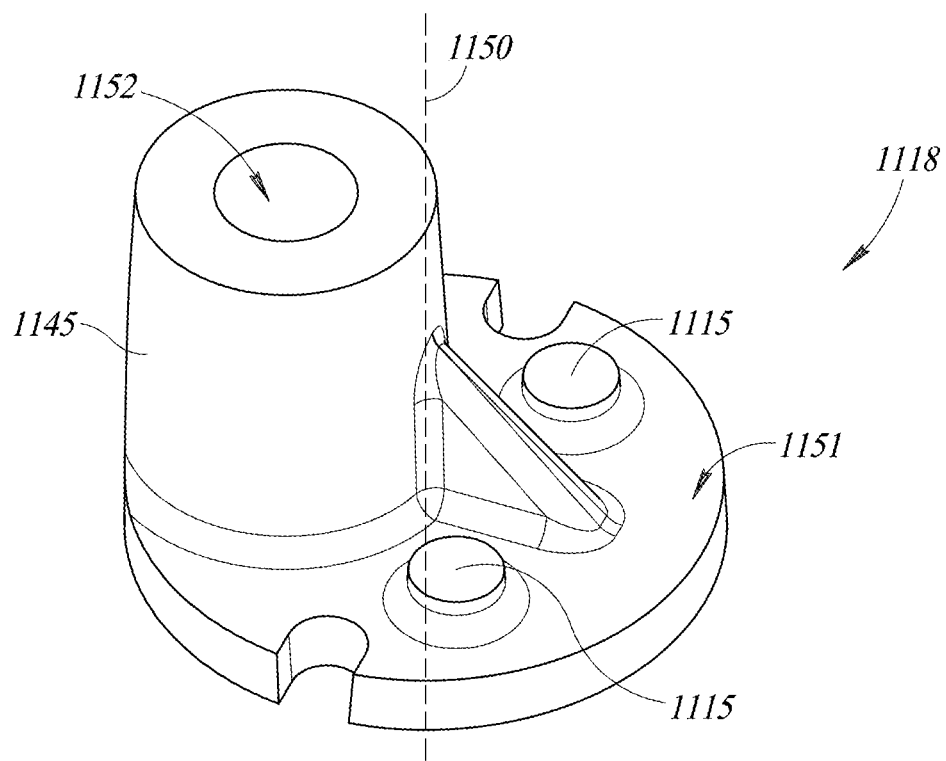
FIG. 7D is a bottom perspective view of the fastening insert of FIG. 7C.

FIGS. 7C-7D illustrate a fastening insert 1118 according to an alternative implementation. The fastening insert 1118 is generally similar to the fastening insert 18 illustrated in FIGS. 7A-7B, but provides a variation in which a lower surface 1151 includes a plurality of boss elements 1115 which extend or protrude outwardly from the lower surface 1151. The boss elements 1115 are generally sized and shaped to strengthen a joint formed with the fastening insert 1118 and the panel to which the fastening insert 1118 is coupled. For instance, the boss elements 1115, post-coupling, resist decoupling of the fastening insert 1118, as removal would require overcoming the shear forces of the joint formed between the panel and the fastening insert 1118. As illustrated in FIGS. 7C-7D, the fastening insert 1118 includes a fastener aperture 1147 which extends through a cap portion 1144 and is located to be offset relative to a central axis 1150 of the fastening insert 1118. Again, the fastener aperture 1147 is substantially coaxial with a shaft insert aperture 1152 that extends through a shaft portion 1145.

Figure 7E:
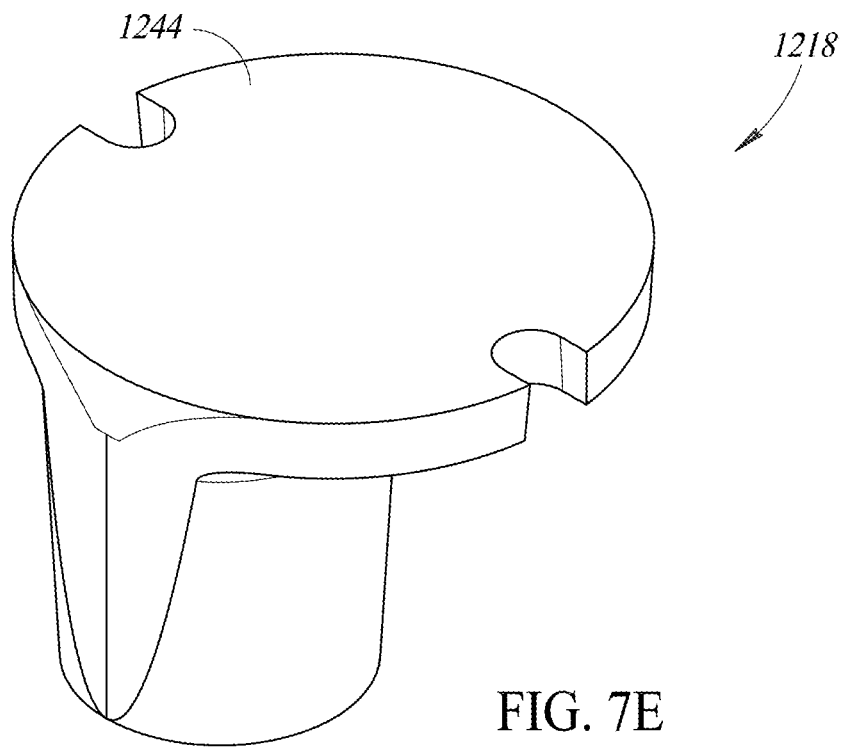
FIG. 7E is a top perspective view of a fastening insert, according to one example implementation.
Figure 7F:
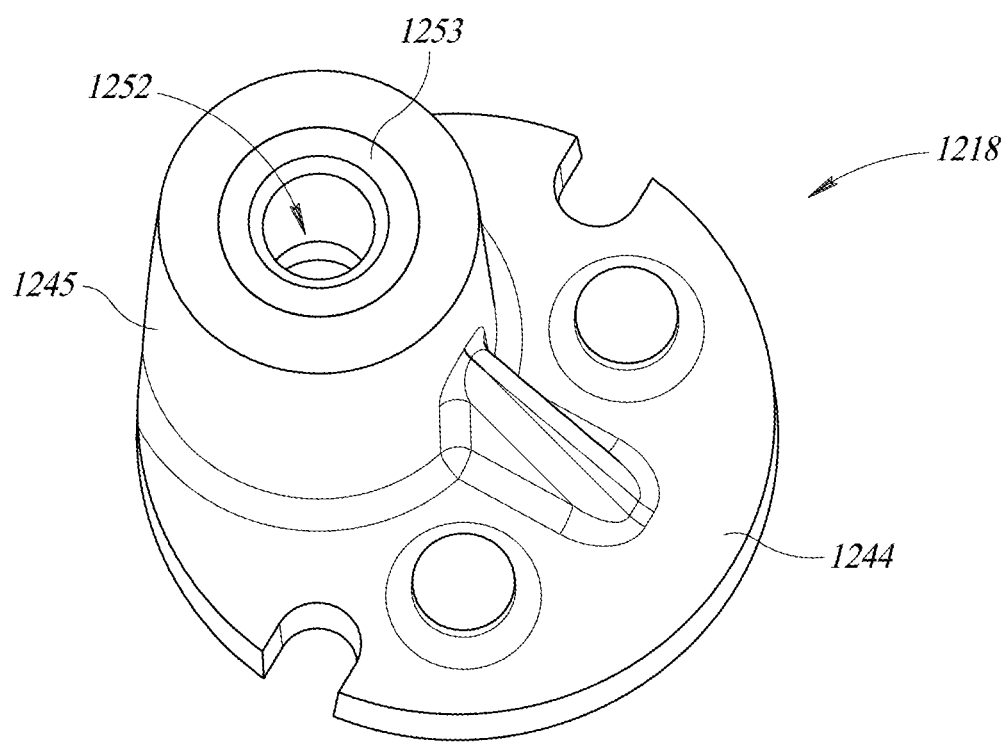
FIG. 7F is a bottom perspective view of the fastening insert of FIG. 7E.

FIGS. 7E-7F illustrate a fastening insert 1218 according to an alternative implementation. The fastening insert 1218 is generally similar to the fastening insert 1118 illustrated in FIGS. 7C-7D, but provides a variation in which the fastening insert 1218 includes a shaft insert aperture 1252 that extends through a shaft portion 1245 but omits a fastener aperture that extends through a cap portion 1244. In general, in such an implementation, the fastening insert 1218 does not include an aperture that extends through a body of the fastening insert 1218. Further, as illustrated in FIG. 7F, the fastening insert 1218 is sized and shaped to optionally coupleably receive a fastening threaded insert 1253.

Figure 7G:
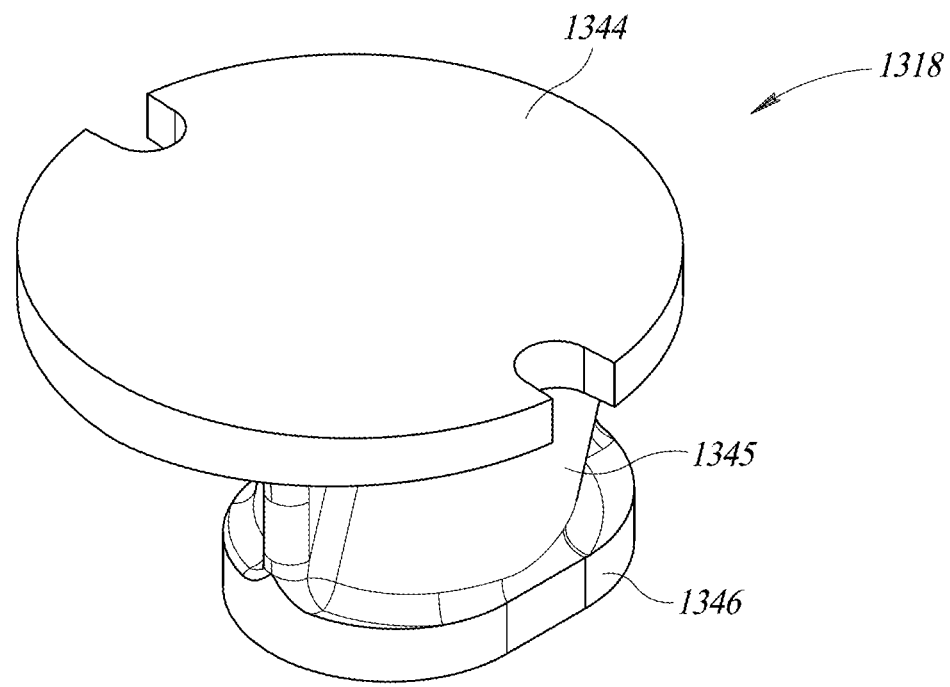
FIG. 7G is a top perspective view of a fastening insert, according to one example implementation.
Figure 7H:
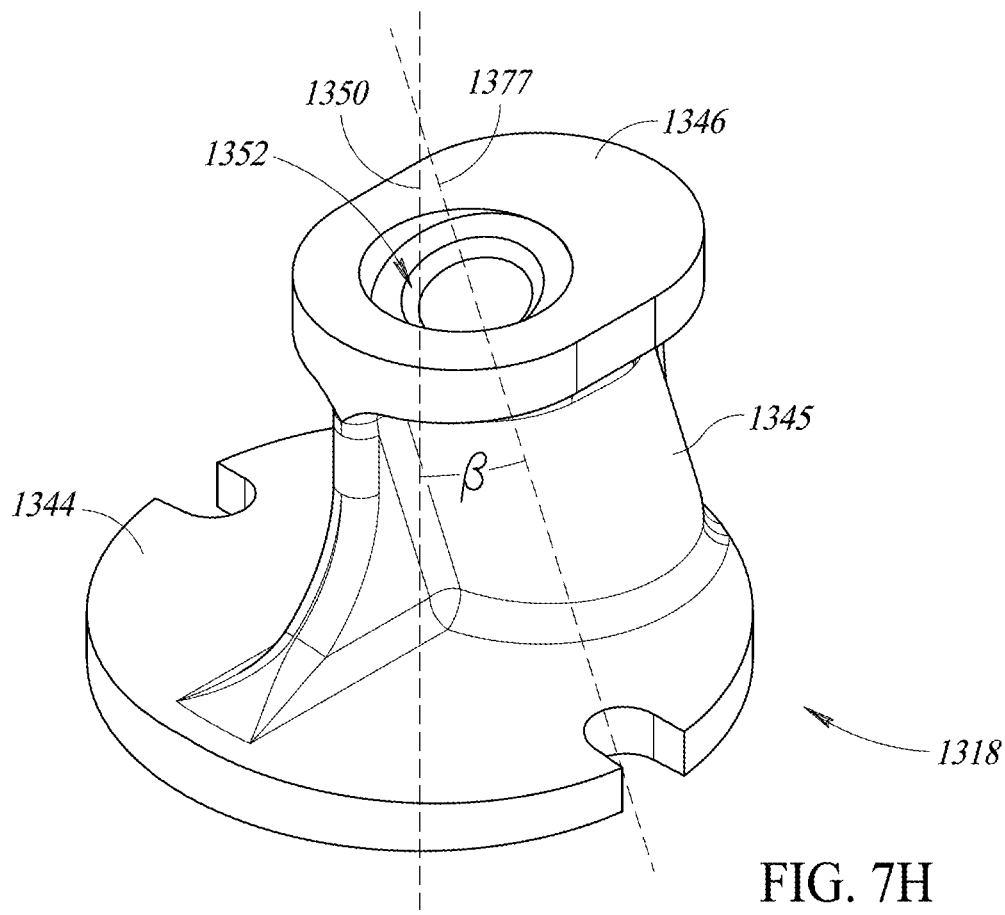
FIG. 7H is a bottom perspective view of the fastening insert of FIG. 7G.

FIGS. 7G-7H illustrate a fastening insert 1318 according to an alternative implementation. This fastening insert 1318 is generally similar to the fastening inserts illustrated above, but provides a variation in which the fastening insert 1318 includes a shaft portion 1345 that extends between a cap portion 1344 and a support portion 1346. In particular, the shaft portion 1345 extends at an angular orientation relative to a central axis 1350 of the fastening insert 1318. As such, in this implementation of the fastening insert 1318, a shaft insert aperture 1352 that extends through the shaft portion 1345 is offset from the central axis 1350 and extends at an angular orientation relative to the central axis 1350 such that a central shaft portion axis 1377 is angularly spaced apart relative to the central axis 1350 at an angle β. Further, similar to the fastening insert 1218 illustrated in FIGS. 7E-7F, the fastening 1318 omits a fastener aperture that extends through the cap portion 1344. While the fastening insert 1318 illustrated in FIGS. 7G-7H omits boss elements, in other implementations, the fastening insert 1318 can include one or more boss elements. Moreover, in some implementations, the fastening insert 1318 can include a fastener aperture which extends through the cap portion 1344 and can be sized and shaped to receive a fastening threaded insert.

Figure 7I:
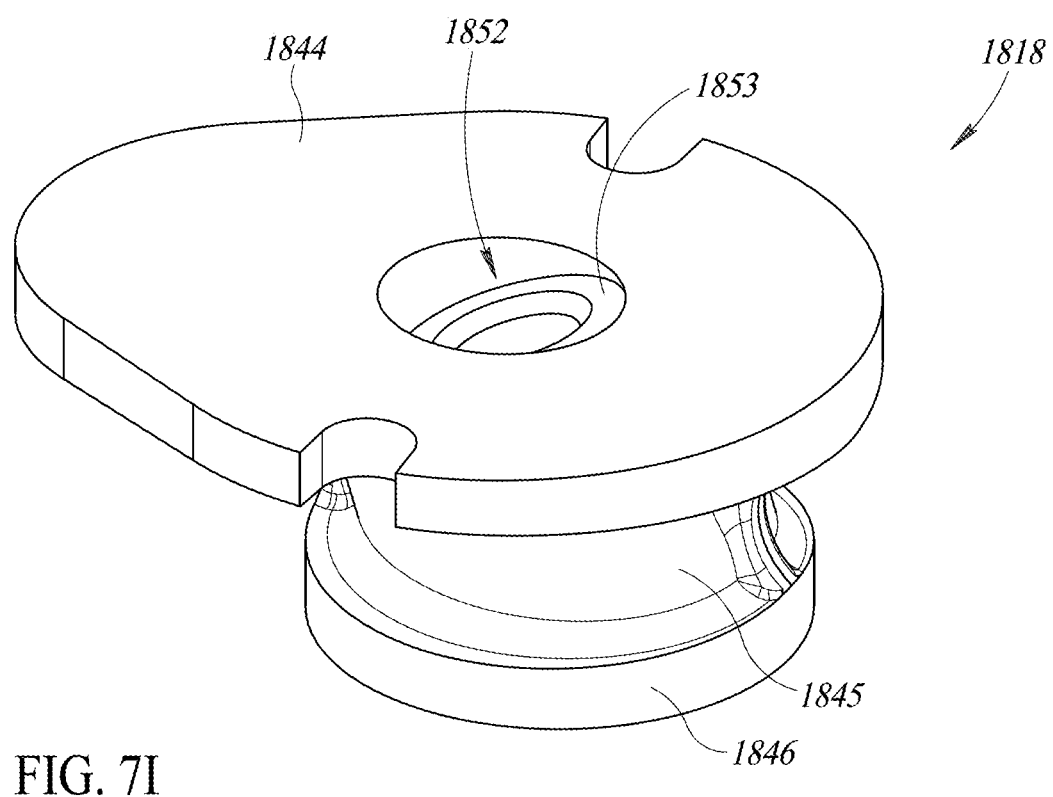
FIG. 7I is a top perspective view of a fastening insert, according to one example implementation.
Figure 7J:
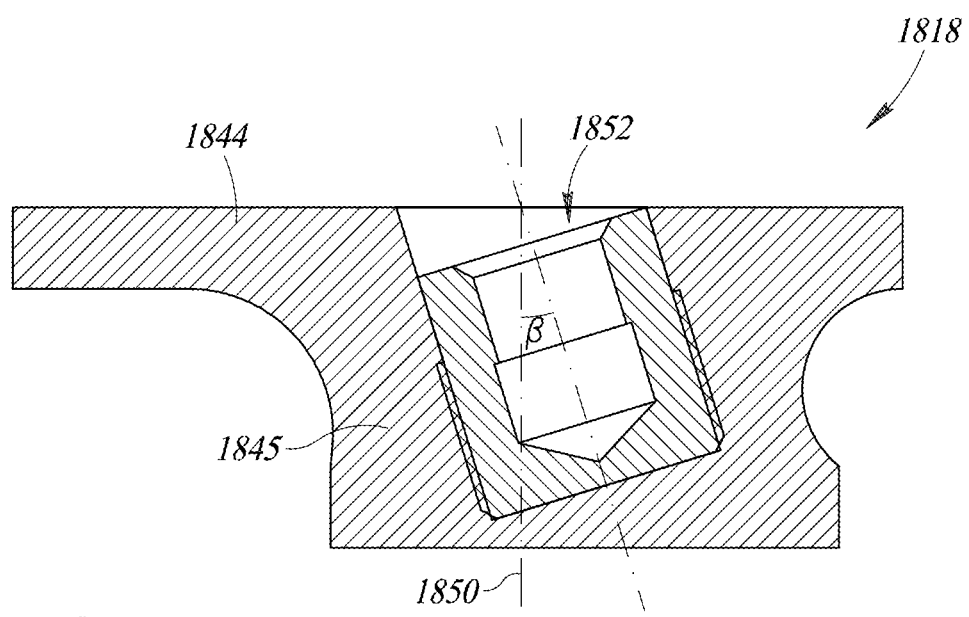
FIG. 7J is a cross-sectional view of the fastening insert of FIG. 7I, taken along a central plane of the fastening insert.

FIGS. 7I-7J illustrate a fastening insert 1818 according to an alternative implementation. This fastening insert 1818 is generally similar to the fastening inserts illustrated above, for example, fastening insert 1318, but provides certain variations. The fastening insert 1818 includes a cap portion 1844 that has an asymmetric shape, such as, for example, a substantially oval shape and a shaft portion 1845 that extends between the cap portion 1844 and a support portion 1846. The asymmetric shape can facilitate a clocking feature, for example, where the cap portion 1844 is sized and shaped to be received in an aperture of a panel in a certain orientation. For instance, such a clocking feature can facilitate locating the fastening insert 1818 in a panel.

The shaft portion 1845 extends at an angular orientation relative to a central axis 1850 of the fastening insert 1818. As such, in this implementation of the fastening insert 1818, a shaft insert aperture 1852 that extends through the shaft portion 1845 extends at an angular orientation relative to the central axis 1850 such that the insert aperture 1852 is angularly oriented relative to the central axis 1850 at an angle β. The angle β can vary to accommodate a wide variety of installations. Further, in contrast to the fastening insert 1318, the insert aperture 1852 extends through the cap portion 1844 and at least partially through the shaft portion 1845 but omits extending through the support portion 1845. Again, the insert aperture 1852 can be sized and shaped to receive a fastening threaded insert, which may function as a blind fastening threaded insert, for example, blind fastening threaded insert 1853.

Figure 8A:
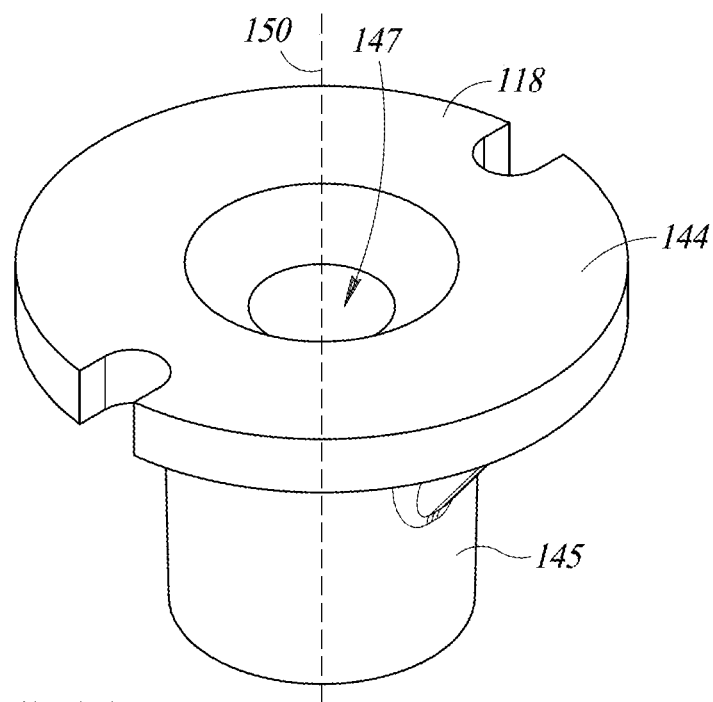
FIG. 8A is a top perspective view of a fastening insert, according to one example implementation.
Figure 8B:
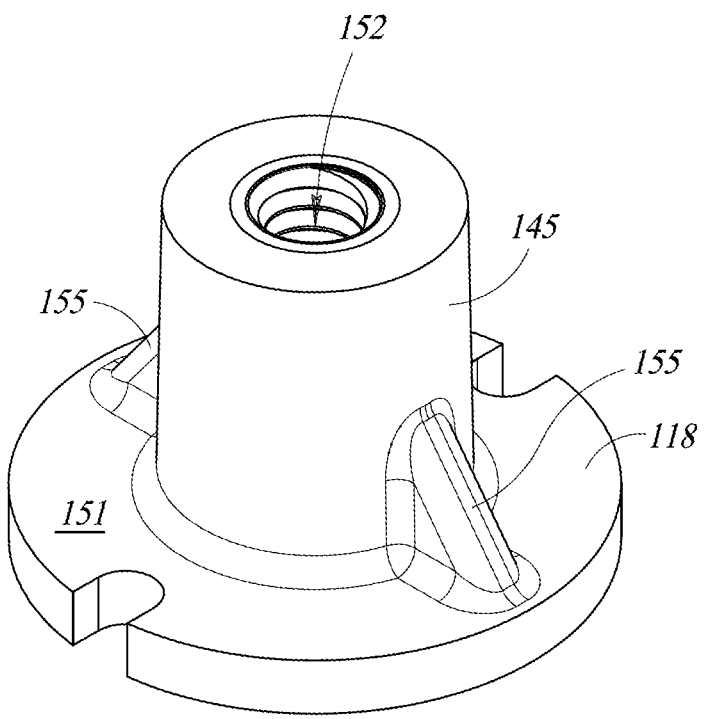
FIG. 8B is a bottom perspective view of the fastening insert of FIG. 8A.

FIGS. 8A-8B illustrate a fastening insert 118 according to an alternative implementation. The fastening insert 118 is generally similar to the fastening insert 18 illustrated in FIGS. 7A-7B, but provides a variation in which a fastener aperture 147 extends through a cap portion 144 and is located to be substantially coaxial with a central axis 150 of the fastening insert 118. In other implementations, however, the cap portion 144 can exclude the fastener aperture 147 and have a solid structure. As illustrated in FIGS. 8A-8B, a shaft portion 145 of the fastening insert 118 is also located centrally relative to the central axis 150 of the fastening insert 118 and includes a shaft insert aperture 152 which is substantially coaxial with the fastener aperture 147. The fastening insert 118 illustrated in FIGS. 8A-8B also includes a pair of rib portions 155, where each rib portion extends from an outer surface of the shaft portion 145 to a lower surface 151 of the cap portion 144 and is a mirror image of each other relative to the central axis 150. In other implementations, however, the fastening inserts 18, 118 can include more than one or a pair of rib portions 55, 155, or may omit rib portions 55, 155.

Figure 8C:
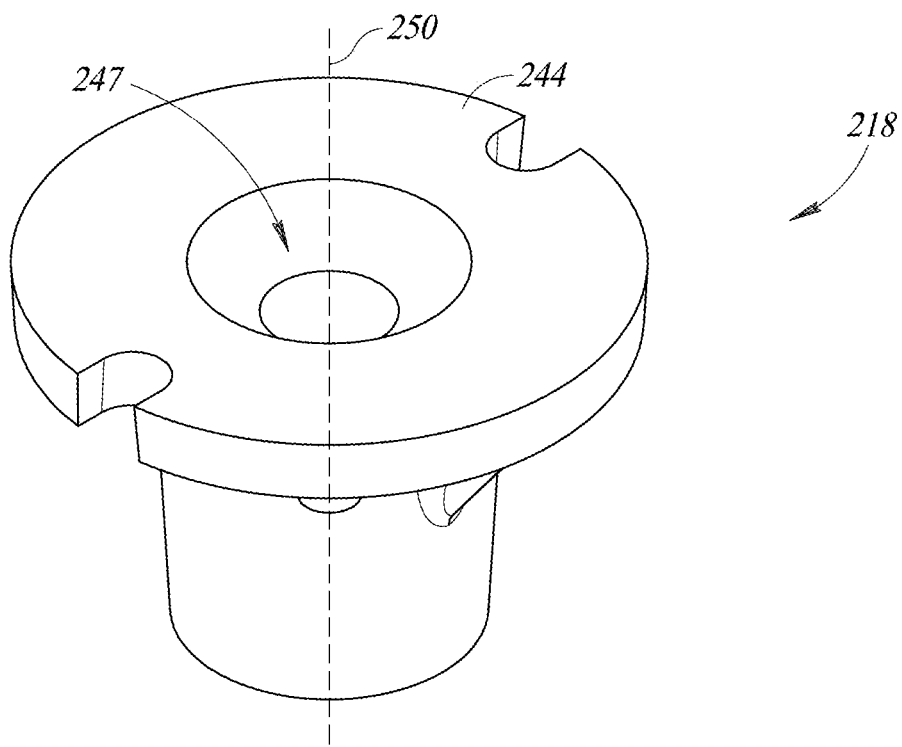
FIG. 8C is a top perspective view of a fastening insert, according to one example implementation.
Figure 8D:
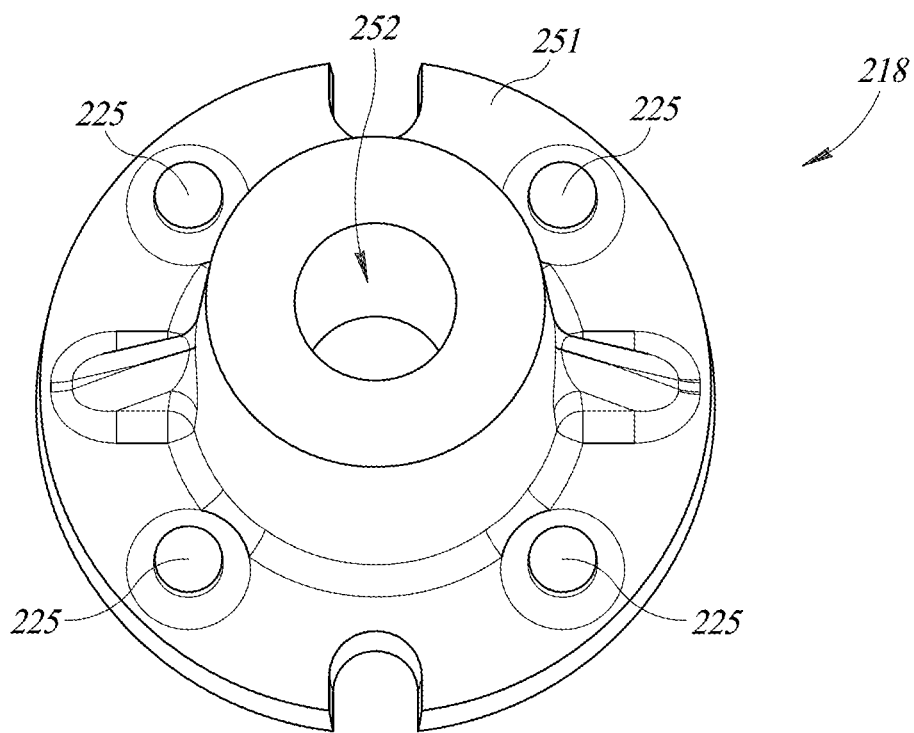
FIG. 8D is a bottom perspective view of the fastening insert of FIG. 8C.

FIGS. 8C-8D illustrate a fastening insert 218 according to an alternative implementation. The fastening insert 218 is generally similar to the fastening insert illustrated in FIGS. 8A-8B, but provides a variation in which a lower surface 251 includes a plurality of boss elements 225 which extend or protrude outwardly from the lower surface 251. The boss elements 225 are generally sized and shaped to strengthen a joint formed with the fastening insert 218 and the panel to which the fastening insert 218 is coupled. For instance, the boss elements 225, post-coupling, resist decoupling of the fastening insert 218, as removal would require overcoming the shear forces of the joint formed between the panel and the fastening insert 218. As illustrated in FIGS. 8C-8D, the fastening insert 218 includes a fastener aperture 247 which extends through a cap portion 244 and is located to be substantially coaxial with a central axis 250 of the fastening insert 218. The fastener aperture 247 is also substantially coaxial with a shaft insert aperture 252.

Figure 8E:
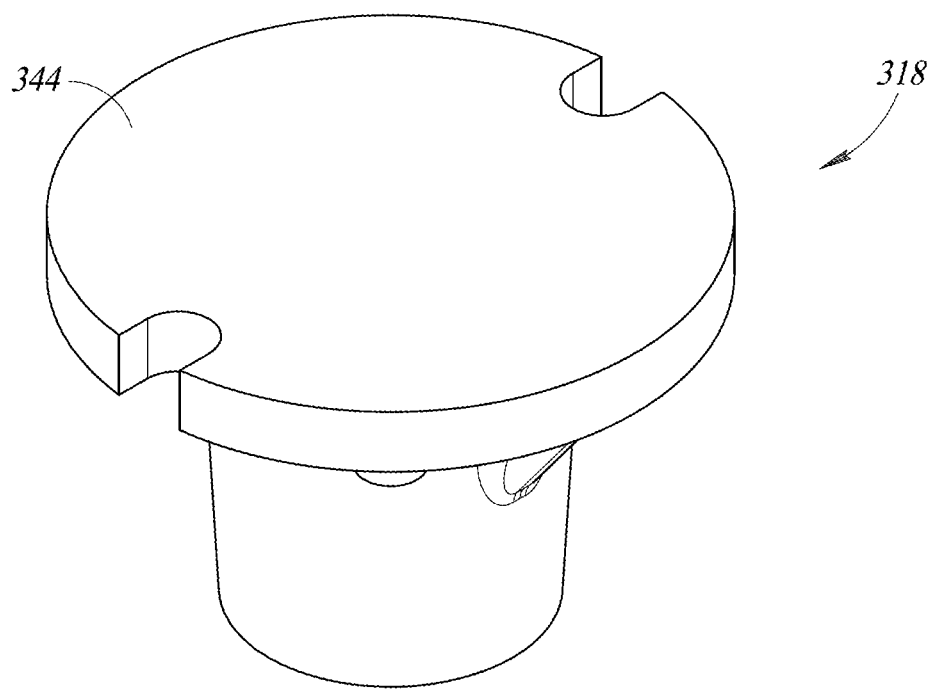
FIG. 8E is a top perspective view of a fastening insert, according to one example implementation.
Figure 8F:
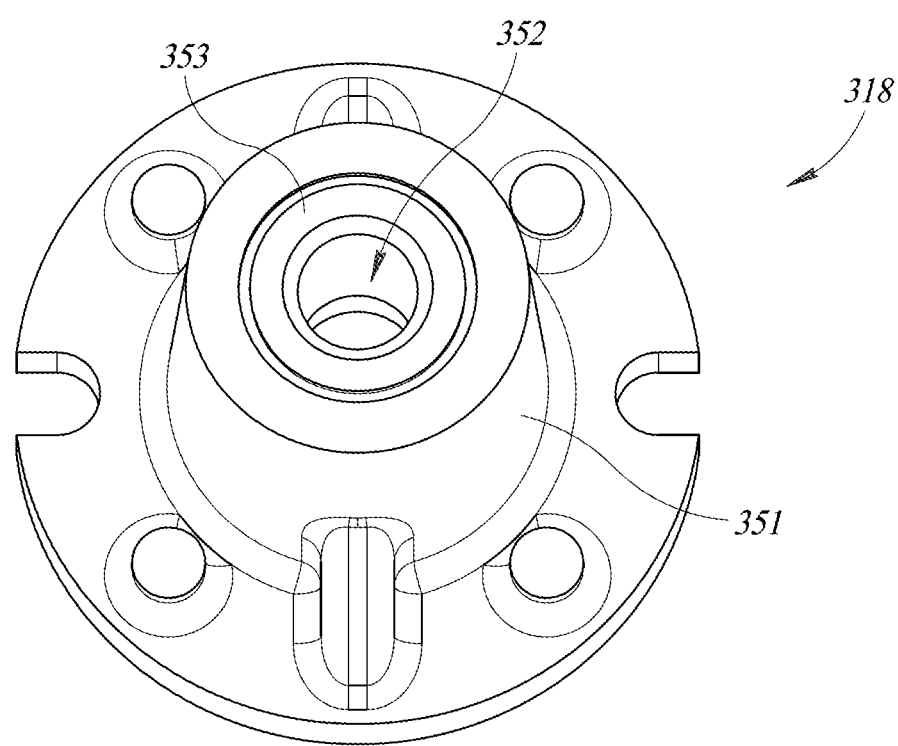
FIG. 8F is a bottom perspective view of the fastening insert of FIG. 8E.

FIGS. 8E-8F illustrate a fastening insert 318 according to an alternative implementation. The fastening insert 318 is generally similar to the fastening insert 218 illustrated in FIGS. 8C-8D, but provides a variation in which the fastening insert 318 includes a shaft insert aperture 352 that extends through a shaft portion 351, but omits a fastener aperture that extends through a cap portion 344. In general, in such an implementation, the fastening insert 318 does not include an aperture that extends through a body of the fastening insert 318. Further, as illustrated in FIG. 8F, the fastening insert 318 is sized and shaped to optionally coupleably receive a fastening threaded insert 353.

Figure 9A:
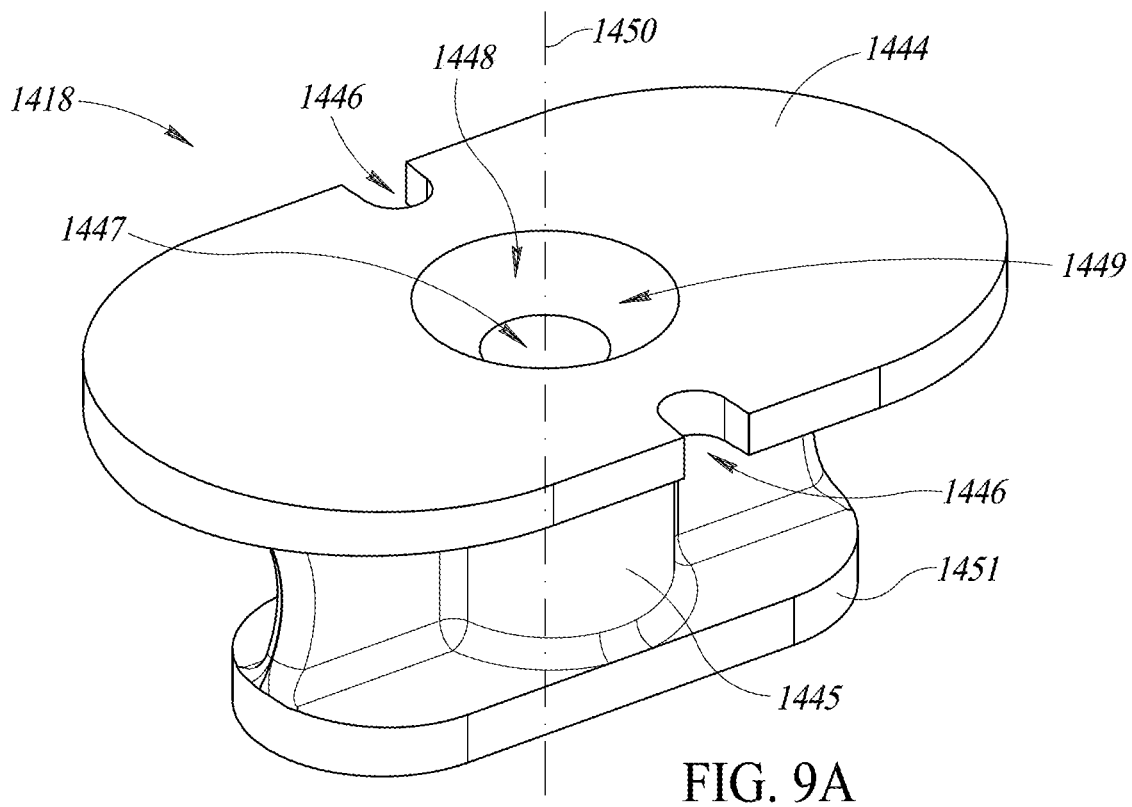
FIG. 9A is a top perspective view of a fastening insert, according to one example implementation.
Figure 9B:
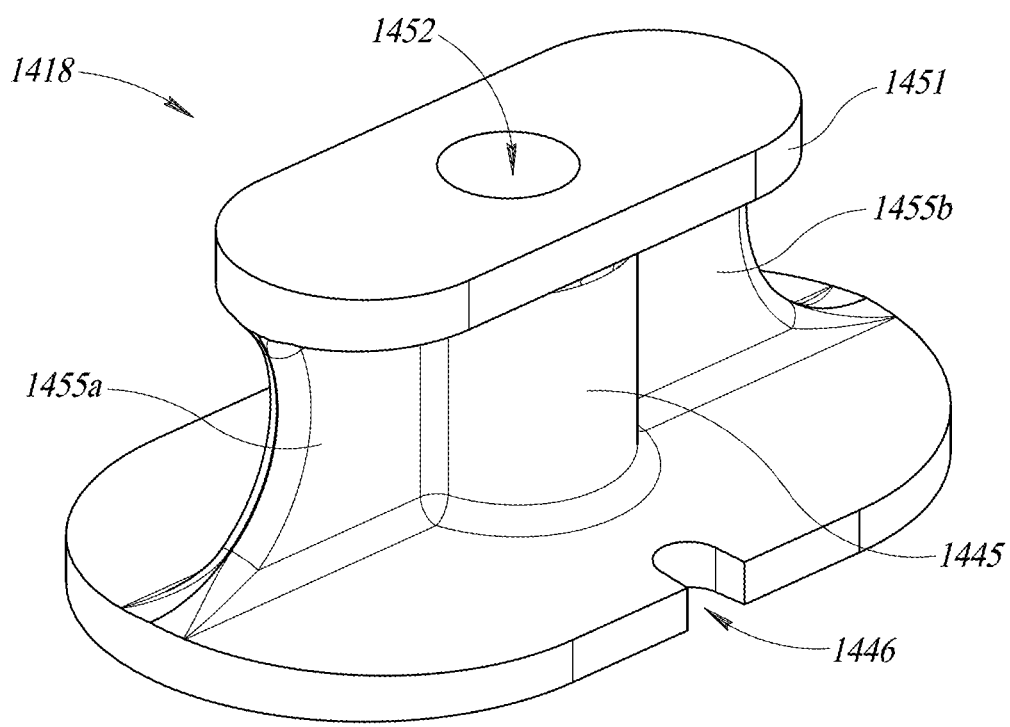
FIG. 9B is a bottom perspective view of the fastening insert of FIG. 9A.

FIGS. 9A-9B illustrate a fastening insert 1418 according to an alternative implementation. The fastening insert 1418 is generally similar to the fastening insert 218 illustrated in FIGS. 8C-8D, but provides a variation in which a cap portion 1444 has a larger cross sectional area and, more generally, a larger footprint, and includes a support portion 1451. As illustrated in FIGS. 9A, 9B, a footprint of the support portion 1451 is generally less than the footprint of the cap portion 1444. A shaft portion 1445 extends between the cap portion 1444 and the support portion 1451. The fastening insert 1418 includes a pair of rib portions 1455a, 1455b that protrude outwardly from an outer surface of the shaft portion 1445. Each rib portion 1455a, 1455b extends between a lower surface 1457 of the cap portion 1444 and an upper surface 1458 of the support portion 1451. Each rib portion 1455a, 1455b mirrors the other relative to a central axis 1450 of the fastening insert 1418. In some implementations, the fastening insert 1418 can include one rib portion, or any number of rib portions, or may omit the rib portions 1455.

As illustrated in FIGS. 9A-9B, the fastening insert 1418 includes a fastening aperture 1447 which extends through the cap portion 1444 and is located to be substantially coaxial with the central axis 1450 of the fastening insert 1418. The fastener aperture 1447 is also substantially coaxial with a shaft insert aperture 1452 that extends through the shaft portion 1445 and the support portion 1451. The cap portion 1444 includes a pair of slots 1446. Additionally, the fastener aperture 1447 is surrounded by a neck down region 1448 disposed in the cap portion 1444 which is sized and shaped to provide a countersink 1449. The countersink 1449 is sized and shaped to receive a fastener, e.g., fastener 20, such that an exterior surface of the fastener sits substantially flush with an exterior surface of the cap portion 1444 when the fastener is coupleably received by the fastening insert 1418.

Figure 9C:
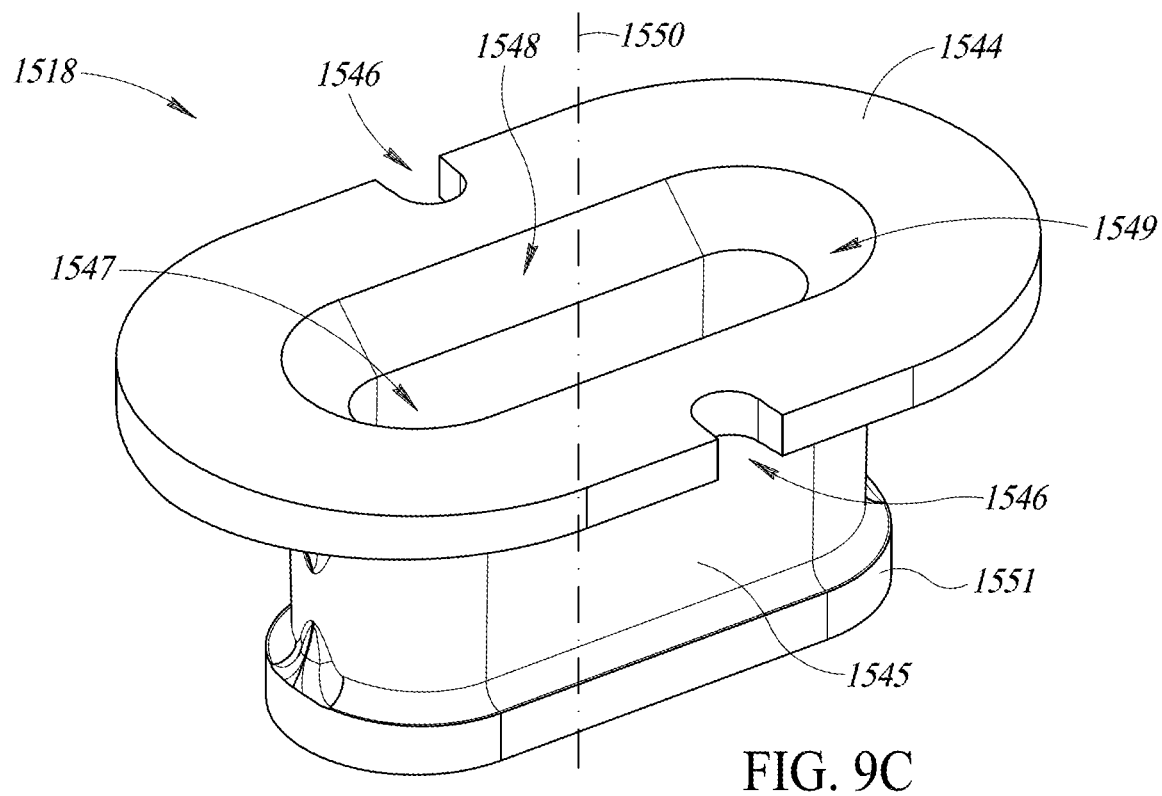
FIG. 9C is a top perspective view of a fastening insert, according to one example implementation.
Figure 9D:
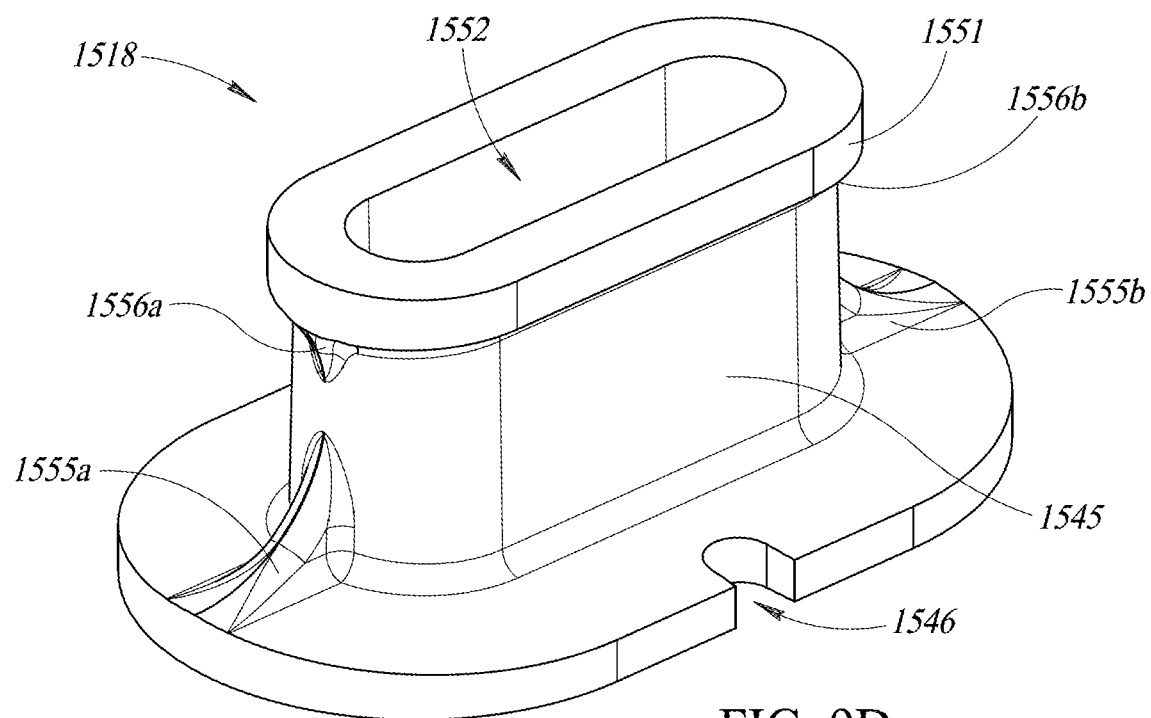
FIG. 9D is a bottom perspective view of the fastening insert of FIG. 9C.

FIGS. 9C-9D illustrate a fastening insert 1518 according to an alternative implementation. The fastening insert 1518 is generally similar to the fastening insert 1418 illustrated in FIGS. 9A-9B, but provides a variation in which a fastener aperture 1547 and a shaft insert aperture 1552 are sized and shaped as a slot to receive one or more fasteners that can be moved within the slot to facilitate alignment of surrounding structures that are to be coupled. The fastener aperture 1547 extends through a cap portion 1544 and a center of the fastener aperture 1547 is substantially aligned with a central axis 1550 of the fastening insert 1518. As illustrated in FIGS. 9C-9D, a shaft portion 1545 extends between the cap portion 1544 and a support portion 1551. The fastening insert 1518 illustrated in FIGS. 9C-9D includes a first rib portion 1555a and a second rib portion 1556a, and a third rib portion 1555b and a fourth rib portion 1556b. The first rib portion 1555a and the second rib portion 1556a are a mirror image of respective third rib portion 1555b and fourth rib portion 1556b relative to the central axis 1550 of the fastening insert 1518.

The cap portion 1544 includes a pair of slots 1546. Additionally, the fastener aperture 1547 is surrounded by a neck down region 1548 disposed in the cap portion 1544 which is sized and shaped to provide a countersink 1549. The countersink 1549 is sized and shaped to receive a fastener, e.g., fastener 20, such that an exterior surface of the fastener sits substantially flush with an exterior surface of the cap portion 1544 when the fastener is coupleably received by the fastening insert 1518.

Figure 9E:
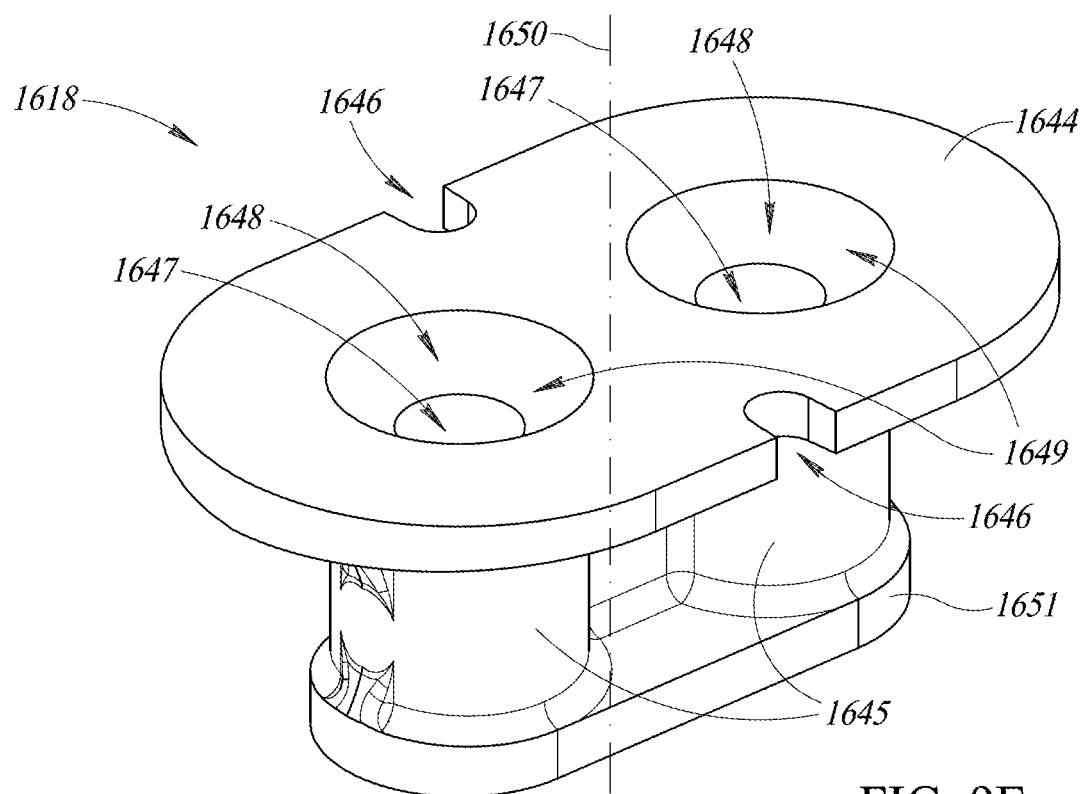
FIG. 9E is a top perspective view of a fastening insert, according to one example implementation.
Figure 9F:
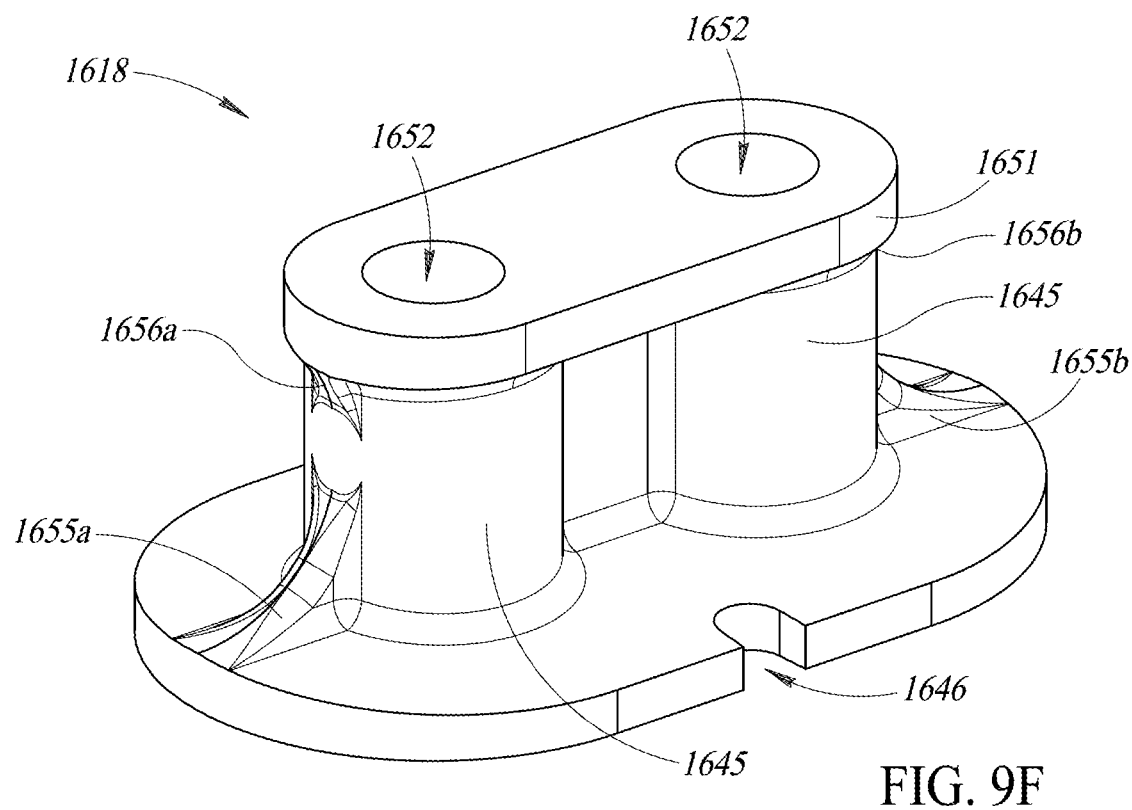
FIG. 9F is a bottom perspective view of the fastening insert of FIG. 9E.

FIGS. 9E-9F illustrate a fastening insert 1618 according to an alternative implementation. The fastening insert 1618 is generally similar to the fastening insert 1418 illustrated in FIGS. 9A-9B, but provides a variation in which there are two fastener apertures 1647 extending through a cap portion 1644 of the fastening insert 1618, and two shaft insert apertures 1652 extending through respective shaft portions 1645 and a support portion 1651 of the fastening insert 1618. Again, the shaft portions 1645 extend between the cap portion 1644 and the support portion 1651 of the fastening insert 1618. As illustrated in FIGS. 9E-9F, centers of the fastener apertures 1647 and the shaft insert apertures 1652 are substantially aligned with each other. In some implementations, as illustrated in FIGS. 9E, 9F, the shaft portions 1645 are generally equally spaced apart relative to a central axis 1650 of the fastening insert 1618.

The fastening insert 1618 illustrated in FIGS. 9E-9F includes a first rib portion 1655a and a second rib portion 1656a, and a third rib portion 1655b and a fourth rib portion 1656b. The first rib portion 1655a and the second rib portion 1656a are a mirror image of respective third rib portion 1655b and fourth rib portion 1656b relative to the central axis 1650 of the fastening insert 1618. Further, the cap portion includes a pair of slots 1646. Additionally, each fastener aperture 1647 is surrounded by a respective neck down region 1648 disposed in the cap portion 1644 which is sized and shaped to provide a respective countersink 1649.

The countersinks 1649 are sized and shaped to receive a fastener, e.g., fastener 20, such that an exterior surface of the fastener sits substantially flush with an exterior surface of the cap portion 1644 when the fastener is coupleably received by the fastening insert 1618.

Figure 9G:
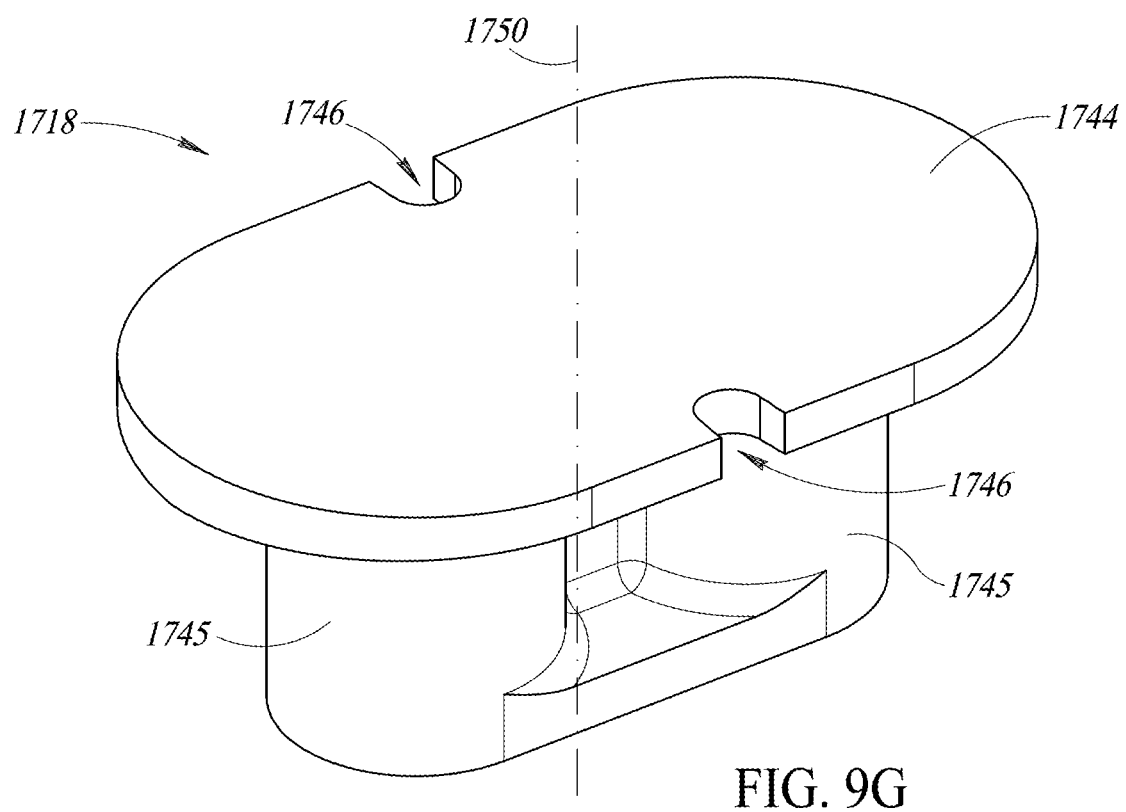
FIG. 9G is a top perspective view of a fastening insert, according to one example implementation.
Figure 9H:
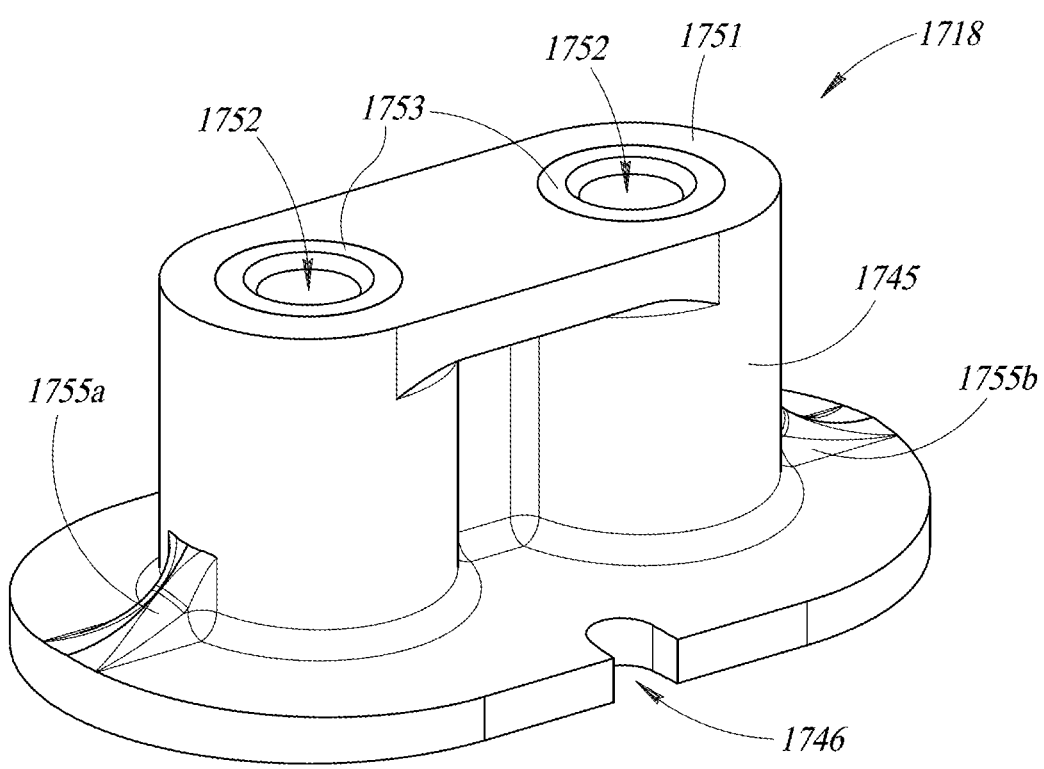
FIG. 9H is a bottom perspective view of the fastening insert of FIG. 9G.

FIGS. 9G-9H illustrate a fastening insert 1718 according to an alternative implementation. The fastening insert 1718 is generally similar to the fastening insert 1618 illustrated in FIGS. 9E-9F, but provides a variation in which the fastening insert 1718 includes two shaft insert apertures 1752 that extend through respective shaft portions 1745 and a support portion 1751, but omit fastener apertures that extend through a cap portion 1744. In general, in such an implementation, the fastening insert 1718 does not include an aperture that extends through a body of the fastening insert 1718. However, the shaft insert apertures 1752 are optionally sized and shaped to coupleably receive a fastening threaded insert 1753.

The fastening insert 1718 illustrated in FIGS. 9G-9H includes a pair of rib portions 1755a, 1755b that protrude outwardly from an outer surface of respective shaft portions 1745. Each rib portion 1755a, 1755b mirrors the other relative to a central axis 1750 of the fastening insert 1718. In some implementations, the fastening insert can include one rib portion, or any number of rib portions, or may omit the rib portions 1755. Further, the cap portion 1744 of the fastening insert 1718 includes a pair of slots 1746.

Figure 10A:
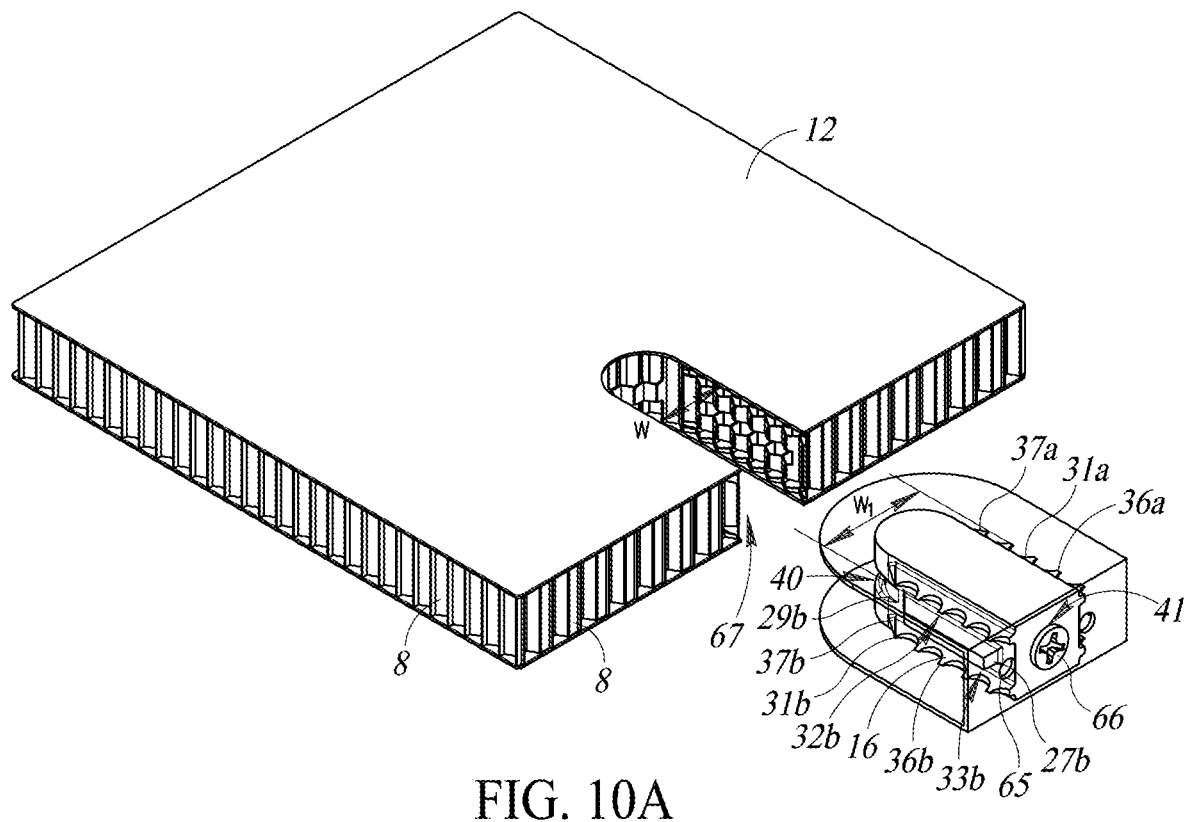
FIG. 10A is a perspective view of a panel illustrating pre-installation of an elongated insert, according to one example implementation.
Figure 10B:
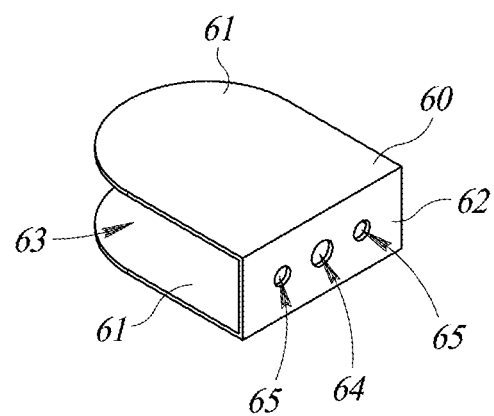
FIG. 10B is a perspective view of an installation fixture, according to one example implementation.

FIGS. 10A-10D illustrate various stages of installation of the elongated insert 16 in the first panel 12. With reference to FIGS. 10A-10D and continued reference to FIGS. 1-4D, the elongated insert 16 can be coupled to the first panel 12 via an elongated insert fixture 60, as illustrated in detail in FIG. 10B. In particular, as illustrated in FIG. 10B, the elongated insert 16 is coupled to the first panel 12 such that the insert aperture 41 and/or the threaded insert 42 of the elongated insert 16 is located at a peripheral side 8 of the first panel 12. Locating the elongated insert 16 in this manner allows the first panel 12 to be coupled to an adjacent panel, e.g., at or along one or more of the peripheral sides 8, such as through the honeycomb core, with the coupling side of the elongated insert 16, i.e., back side 26 exposed to be coupled to an adjoining panel, i.e., second panel 14. Constructing panel assemblies, e.g., panel assembly 10, in this manner allows for ease of construction and assembly and/or disassembly. For example, using the components of the panel assemblies according to the various implementations described herein reduces the overall weight footprint of the panel assemblies, e.g., panel assembly 10, and permits constructing structures, enclosures, etc., by assembling a plurality of panel assemblies via peripheral sides of one or more of the panel assemblies, which panel assemblies can be removably coupled and reused upon disassembly, and can be decoratively finished prior to installation.

The elongated insert fixture 60 includes a pair of opposing sides 61 protruding outwardly from a back side 62. The opposing sides 61 protrude outwardly from the back side 62 to define an elongated insert receiving region 63. The elongated insert receiving region 63 is sized and shaped to tautly receive the elongated insert 16. In particular, the back side 62 of the elongated insert fixture 60 includes a first fixture aperture 64 which is positioned to align with the insert aperture 41 disposed on the back side 26 of the elongated insert 16. Adjacent to the first fixture aperture 64, the elongated insert fixture 60 includes a pair of adhesive apertures 65, each adhesive aperture 65 spaced apart from the first fixture aperture 64. As illustrated in FIG. 10A, the elongated insert 16 is received in the elongated insert receiving region 63 and is coupled to the elongated insert fixture 60 via a fixture fastener 66 which extends through the first fixture aperture 64 and the insert aperture 41 and, more particularly, is coupled to the threaded insert 42 (FIG. 10D) received in the insert aperture 41.

With specific reference to FIG. 10A, the first panel 12 is illustrated prior to installation of the elongated insert 16. The first panel 12 includes an insert slot 67 which is sized and shaped to receive the elongated insert 16. In particular, the insert slot 67 has a certain width W, which width W is sized to be slightly less than a width W1 of the elongated insert 16. In this manner, as the elongated insert 16 is inserted in the insert slot 67 via the elongated insert fixture 60, the cutting members 31a, 31b on each side of the elongated insert 16 cut through the honeycomb core of the first panel 16. More particularly, the prism-shaped surfaces of the cutting edges 37a, 37b contact the honeycomb core to create an initial cut and as the elongated insert 16 travels longitudinally, the serrated edges 36a, 36b continue to cut through the honeycomb core. As illustrated in FIG. 10A, the positioning of the cutting members 31a, 31b proximal to the upper and lower face sheets of the first panel 12 on either side of the elongated insert 16 facilitates flow of adhesive near or adjacent to the face sheets as the cutting members 31a, 31b pierce or cut through the honeycomb core, as described in more detail below.

As the elongated insert 16 travels longitudinally with the cutting members 31a, 31b cutting through the honeycomb core as described above, each core pusher member 27a, 27b contacts the honeycomb core and drives or pushes the honeycomb core away from honeycomb core that was cut or serrated via the cutting edges 37a, 37b of the cutting members 31a, 31b. In particular, as the elongated insert 16 is inserted and the honeycomb core is cut, the angular front surfaces 29a, 29b of the core pusher members 27a, 27b contact portions of the honeycomb core between the cutting members 31a, 31b, and push or drive these portions away at least equal to a width of each cutting member 31a, 31b to create openings proximal to the corresponding first and second flow regions 32a, 32b, 33a, 33b.

Figure 10C:
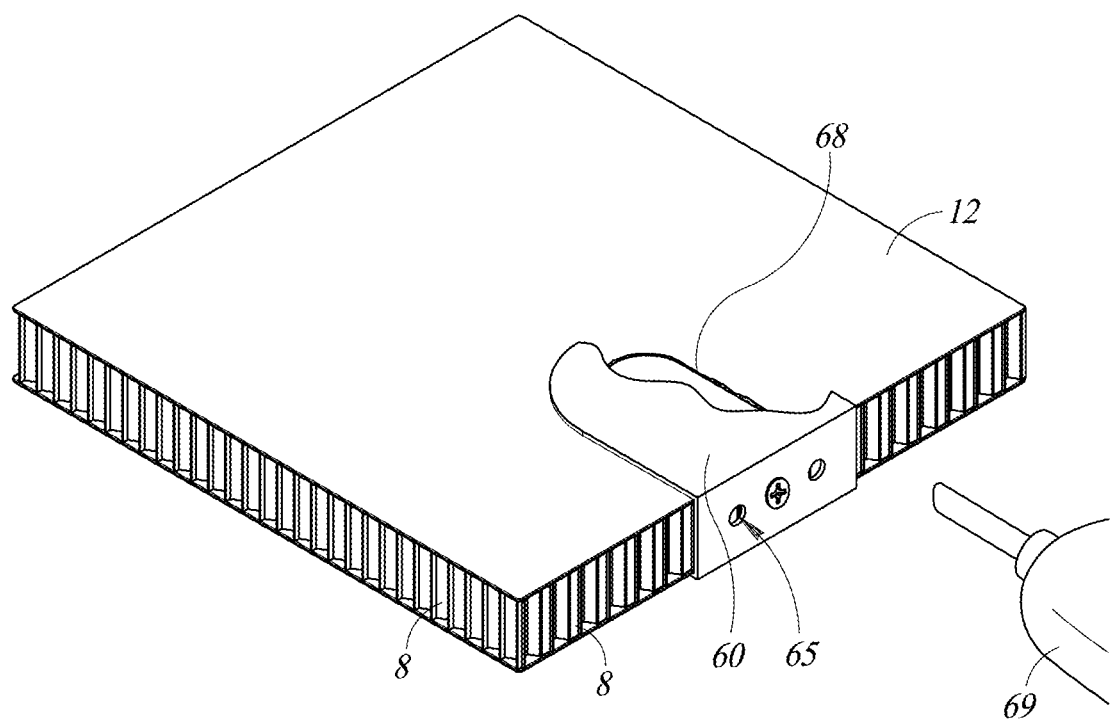
FIG. 10C is a perspective view of the panel of FIG. 8A illustrating intermediate-installation of the elongated insert.

With specific reference to FIG. 10C, the elongated insert 16 is inserted via the elongated insert fixture 60. After installation, a potting compound 68, such as, for example, an epoxy based resin or other form of adhesive, can be applied by using injector nozzles, applicator guns, or the like, for example, as indicated via an applicator gun 69. The potting compound 68 is injected into the first panel 12 via one or the pair of adhesive apertures 65. In implementations where the potting compound 68 is applied through one of the pair of fixture adhesive apertures 65, the potting compound 68 can flow from one of the adhesive apertures 65 into the first panel 12 and around the elongated insert 16 and exit from the other of the pair of adhesive apertures 65, indicating sufficient volume of the potting compound 68 has been applied. Thereafter, any excess or residual potting compound 68 can be removed. Removal can be accomplished by scraping off excess potting compound or by wiping away excess potting compound 68 via a knife, wiping cloths, or the like.

The potting compound 68 flows along the sides of the elongated insert 16 via the first and second flow regions 32a, 32b, 33a, 33b and along the front side 23 of the elongated insert 16 via the front flow region 40 (FIG. 10A). In this manner, the potting compound 68 collects around a periphery of the elongated insert 16 and is thereafter cured. In some implementations, the potting compound 68 can be cured at ambient temperature or at elevated temperatures by use of appropriate heaters.

Figure 10D:
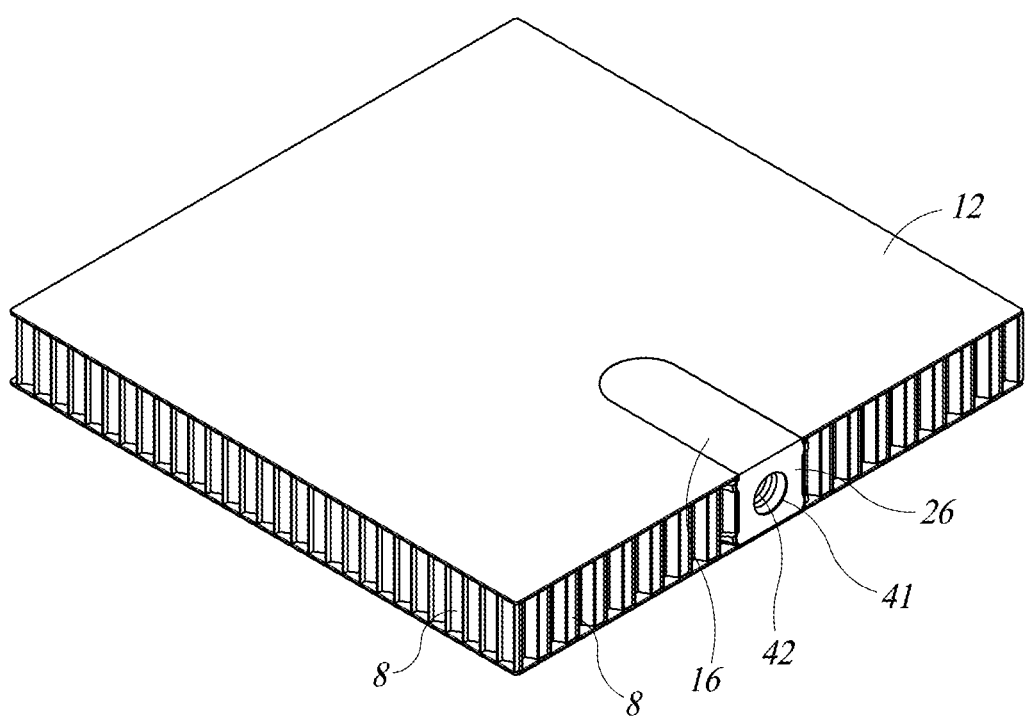
FIG. 10D is a perspective of the panel of FIG. 10A illustrating post-installation of the elongated insert.

The elongated insert fixture 60 can, in some implementations, be removed prior to curing, or in other implementations, post-curing. In either implementation, the elongated insert fixture 60 is removed by removing the fixture fastener 66, leaving the elongated insert 16 installed in the first panel 12, as illustrated in FIG. 10D, with the external surfaces of the elongated insert 16 being substantially flush with the external surfaces of the first panel 12.

While the implementation of FIGS. 10A-10D illustrates installation of the elongated insert 16 in the first panel 12, in other implementations, the various other implementations of the elongated insert described herein, e.g., elongated inserts, 416, 516, 616, 716, 816, 916, etc., can be installed in a similar manner. For instance, elongated inserts 416, 516, 616, 716, 816, 916 can be installed in the first panel 12 via the elongated insert fixture 60 where the adhesive apertures 65 can be sized and shaped to align with the pair of apertures 439, 539 disposed on the back side 426, 526 of the corresponding elongated insert 416, 516, or adjacent to a vertical flange of corresponding T-shaped back sides (e.g., back side 626, 726, 826, 926) of elongated inserts 616, 716, 816, 916. In such an implementation, the omission of the cutting members 31a, 31b and the core pusher members 27a, 27b can facilitate increase in a volume of flow of potting compound 68 via increase in area of the flow regions, e.g., side flow regions 436a, 436b, 536a, 536b, 636a, 636b, etc. and/or front flow regions 440, 540, 640, etc. In this manner, additional installation flexibility can be obtained. For instance, in applications where the potting compound 68 has lower viscosity, the volume of the potting compound 68 needed to provide sufficient bond strength may be provided by the elongated insert 16. In other applications where the potting compound 68 has a higher viscosity, the volume of the potting compound 68 needed to provide sufficient bond strength may be provided by the elongated inserts 416, 516.

Figure 11A:
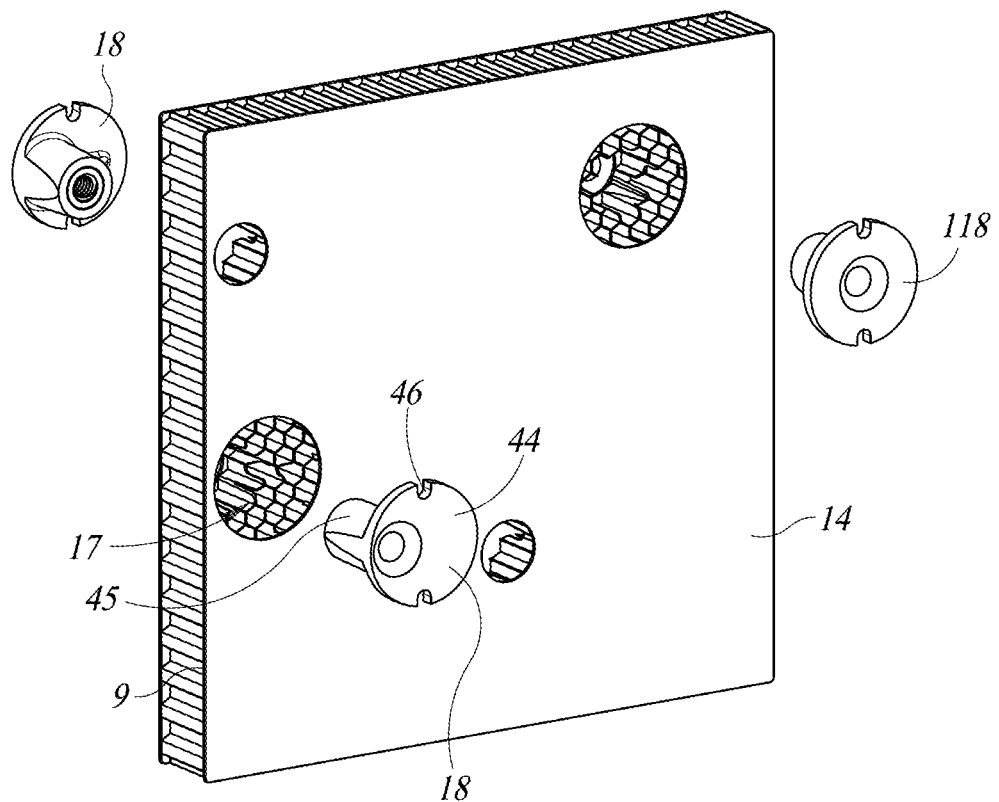
FIG. 11A is a perspective view of a panel illustrating pre-installation of a fastening insert, according to one example implementation.
Figure 11B:
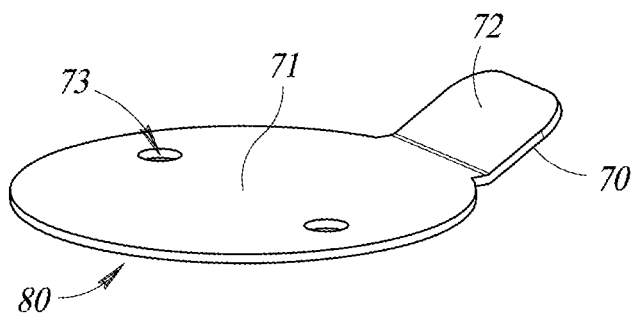
FIG. 11B is a perspective of an installation fixture, according to one example implementation.

FIGS. 11A-11D illustrate various stages of installation of the fastening insert 18 in the second panel 14. With reference to FIGS. 11A-11D and continued reference to FIGS. 1-3 and 7A-8B, the fastening insert 18 can be coupled to the second panel 14 via a fastening insert fixture 70, as illustrated in detail in FIG. 11B. As illustrated in FIG. 11A, the second panel 14 includes a panel aperture 17 which is sized and shaped to receive the fastening insert 18. The panel aperture 17 is located proximal to an edge 9 of the second panel 14, which coupleably receives the fastening insert 18. Locating the fastening insert 18 proximal to the edge 9 of the second panel 14 advantageously allows for flexibility in construction of the panel assemblies according to the various implementations of panel assemblies described herein, as doing so can provide relative ease of assembly/disassembly, sufficient strength properties which reduce or mitigate cracking or other failure modes, and reduce weight foot prints and high cost associated with fastening panels proximal to the edges thereof for the various reasons discussed above. By way of example, locating the fastening insert 18 proximal to the edge 9 can eliminate use of the complicated, heavy tab-slot, L-bracket, etc., configurations. By way of further example, locating the fastening insert 18 proximal to the edge 9 according to the various implementations described herein can improve the shear and other strength capabilities of the panel assemblies.

In particular, the panel aperture 17 is sized and shaped to have an outer diameter which is substantially or approximately equal to the outer diameter of the cap portion 44 of the fastening insert 18. The fastening insert fixture 70 includes a central portion 71 and a tab portion 72. The central portion 71, in some implementations, has a generally circular shape; however, in other implementations, the central portion 71 can have other shapes and configurations, such as square, elliptical, etc. The tab portion 72 extends outwardly from a peripheral edge of the central portion 71 in an angular orientation relative to an external surface of the central portion 71. The angular orientation of the tab portion 72 facilitates providing access to a user to install and/or remove the fastening insert fixture 70 as described in more detail below.

The central portion 71 of the fastening insert fixture 70 includes a pair of fixture adhesive apertures 73 that are located proximal to a peripheral edge of the central portion 71.

Figure 11C:
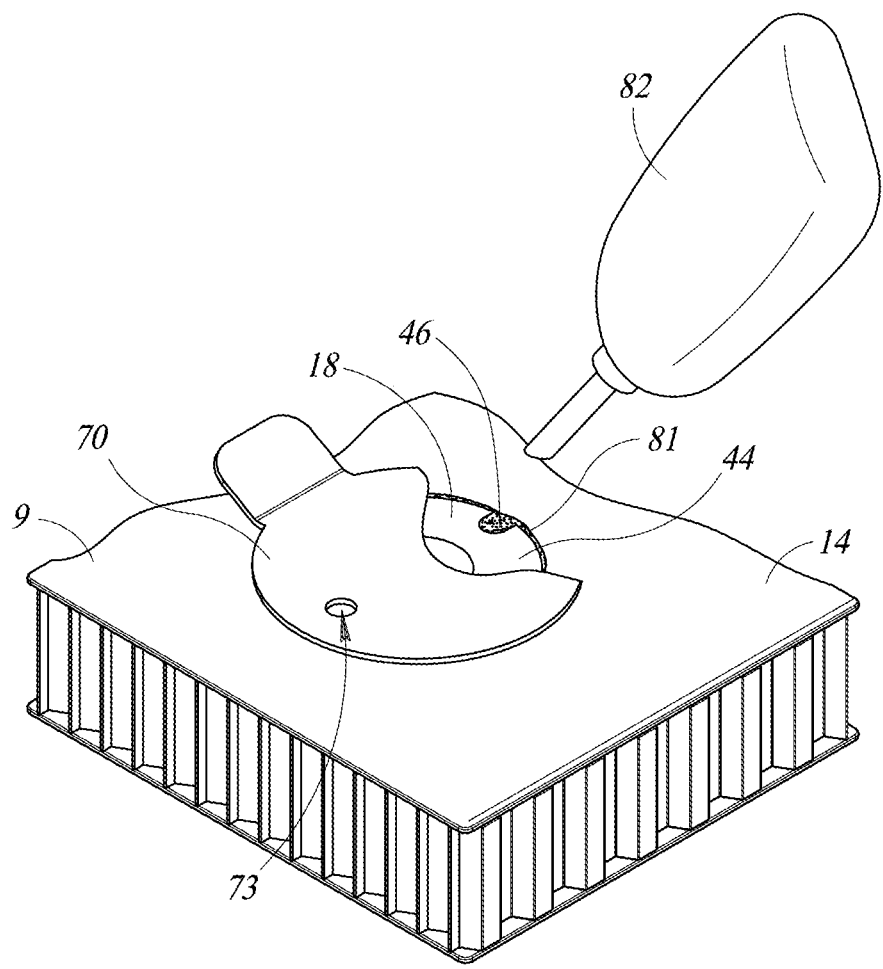
FIG. 11C is a perspective view of the panel of FIG. 8A illustrating intermediate-installation of the fastening insert.

With specific reference to FIG. 11C, the fastening insert fixture 70 is removably coupled to the fastening insert 18 such that the fixture adhesive apertures 73 substantially align with the pair of slots 46 of the fastening insert 18. In some implementations, the fastening insert fixture 70 can be removably coupled to the fastening insert 18 via adhering, such that the fastening insert fixture 70 may be removed after the installation of the fastening insert 18 is completed. For example, a lower surface 80 of the fastening insert fixture 70 can include adhesives that bond with or adhere to an upper surface of the cap portion 44 of the fastening insert 18.

As illustrated in FIG. 11C, the fastening insert fixture 70 is coupled in the manner described above, with the lower surface 80 coupled to the upper surface of the cap portion 44 such that the tab portion 72 is angularly oriented relative to the upper surface of the cap portion 44. Thus, the tab portion 72 allows users to grip, manipulate, and position a combination of the fastening insert fixture 70 and the fastening insert 18 on the second panel 14. Thereafter, the fastening insert fixture 70 along with the fastening insert 18 is inserted into the second panel 14 such that the fastening insert 18 is received in the panel aperture 17.

After installation, a potting compound 81, such as, for example, an epoxy based resin or other form of adhesive, can be applied by using injector nozzles, applicator guns, or the like, for example, as indicated via an applicator gun 82, which potting compound 81 fills the voids, openings, or spaces in the second panel 14 created by the panel aperture 17. The potting compound 81 is injected into the second panel 14 via one or both of the pair of fixture adhesive apertures 73. In this manner, the potting compound 81 flows into the second panel 14 and around the fastening insert 18, in particular, the shaft portion 45, to couple the fastening insert 18 to the honeycomb core of the second panel 14. In some implementations, a backing plate or masking tape can be coupled to the other side second panel 14 to prevent the potting compound 81 from contacting a working surface or other supporting structures.

In implementations where the potting compound 81 is applied through one of the pair of fixture adhesive apertures 73, the potting compound 81 can flow from one of the fixture adhesive apertures 73 into the second panel 14 and around the fastening insert 18 and exit from the other of the pair of fixture adhesive apertures 73, indicating sufficient volume of the potting compound 81 has been applied. Thereafter, any excess or residual potting compound 81 can be removed. Removal can be accomplished by scraping off excess potting compound or by wiping away excess potting compound 81 via a knife, wiping cloths, or the like.

Figure 11D:
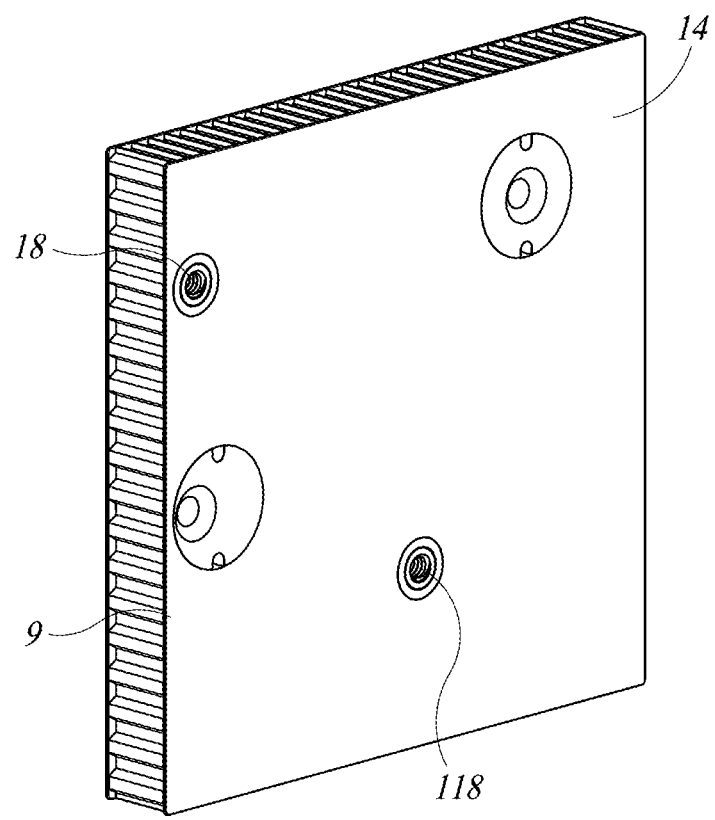
FIG. 11D is a perspective view of the panel of FIG. 8A illustrating post-installation of the fastening insert.

After application of the potting compound 81, in some implementations, the potting compound 81 can be cured at ambient temperature. In some implementations, the fastening insert fixture 70 can be removed prior to curing, or in other implementations, post-curing. In either implementation, the fastening insert fixture 70 is removed by peeling off the fastening insert fixture 70 from the fastening insert 18 via the tab portion of the fastening insert fixture 70, as illustrated in FIG. 11D, with the external surfaces of the fastening insert 18 being substantially flush with the external surfaces of the second panel 14.

Moreover, as illustrated in FIGS. 1-3 and 11A-11D, a number of various implementations of the fastening inserts, e.g., fastening inserts 18, 118, 218, 318, 1118, 1218, 1318, 1418, 1518, 1618, 1718, etc. can be installed in the second panel 14 in a similar manner discussed above. For example, FIGS. 1-2 and 11A, 11D illustrate the fastening insert 118 installed in the second panel 14. Although other fastening inserts can also be installed in a similar manner, for the sake of clarity of description and illustration, fastening insert 118 is described in more detail. For example, in some implementations, the central portion 71 of the insert fixture 70 can be sized and shaped to couple to the cap portions (e.g. cap portions 1444, 1544, 1644, 1744, etc.) of fastening inserts (e.g., fastening inserts 1418, 1518, 1618, 1718, etc.). Further, the panel aperture 17 of the second panel 14 can be sized and shaped to receive corresponding fastening inserts (e.g., fastening inserts 1418, 1518, 1618, 1718, etc.).

Further, as illustrated therein, fastening inserts 18, 118 can be installed from either side of the second panel 14. In this manner, one or more first panels 12 or other components can be coupled to one or more second panels 14 along various positions and orientations to configure various panel assemblies having the various elongated inserts 16, 416, 516, etc. described herein.

Figure 12:
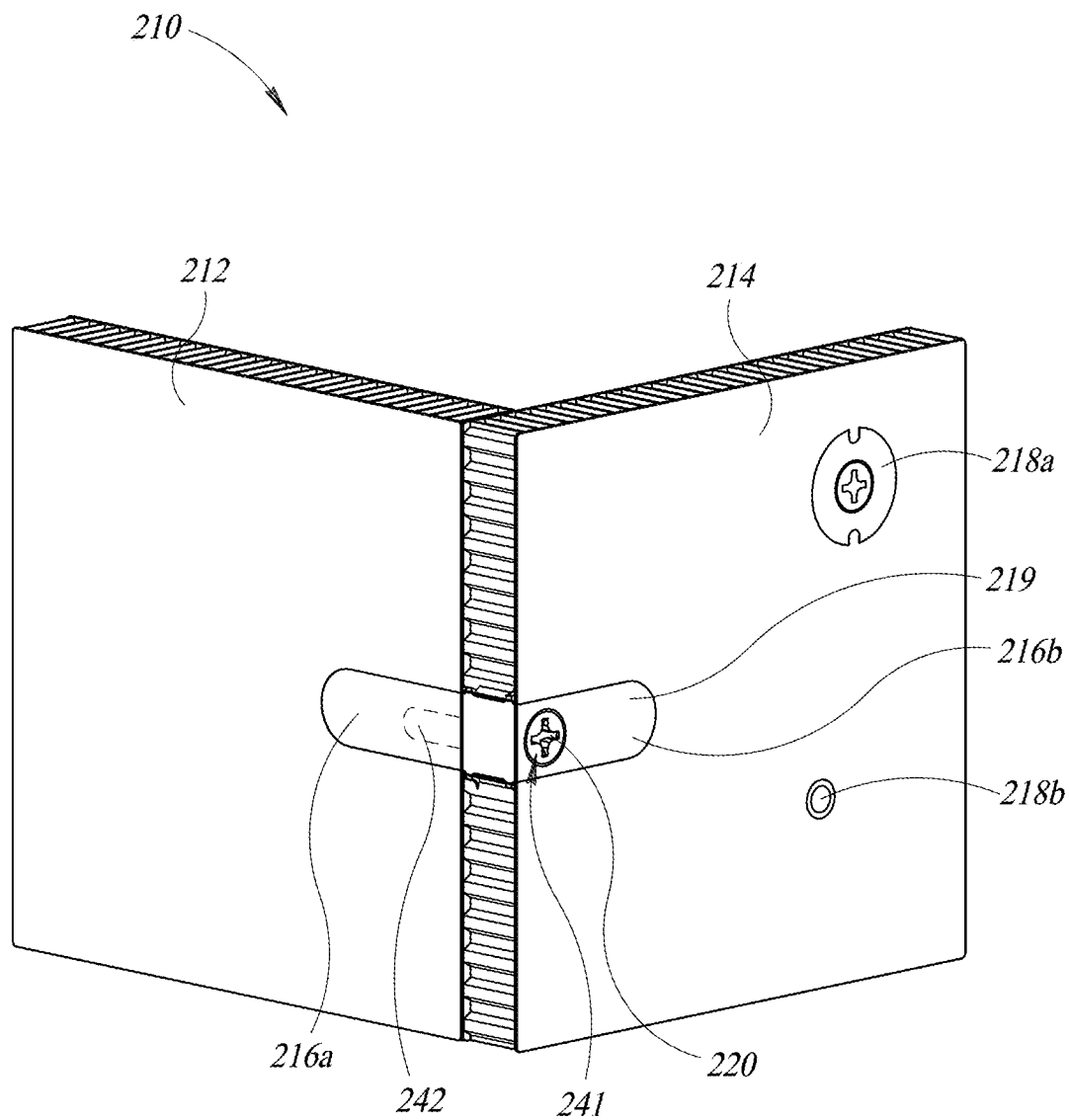
FIG. 12 is a perspective view of a panel assembly, according to one example implementation.

By way of example, FIG. 12 illustrates a panel assembly 210 according to one example implementation. The panel assembly 210 provides a variation in which a first panel 212 includes a first elongated insert 216a, generally similar to the elongated insert 16, and a second panel 214 includes a second elongated insert 216b, generally similar to the elongated insert 516. Again, the second elongated insert 216b provides a variation in which an insert aperture 241 extends through a top side 219 of the second elongated insert 216b. Further, a fastener 220 extends through the insert aperture 241 and is coupled to a threaded insert 242 disposed in the first elongated insert 216a. Accordingly, the first and second panels 212, 214 are coupled to each other via the fastener 220 which extends through the insert aperture 241 of the second elongated insert 216b and is coupled to the first elongated insert 216a disposed in the first panel 212. Further, as illustrated in FIG. 12, the second panel 214 includes fastening inserts 218a, 218b which are generally similar to the fastening insert 118. Thus, the second panel 214 can be coupled to other panels via one or more of the fastening inserts 218a, 218b at or near those positions.

Figure 13:
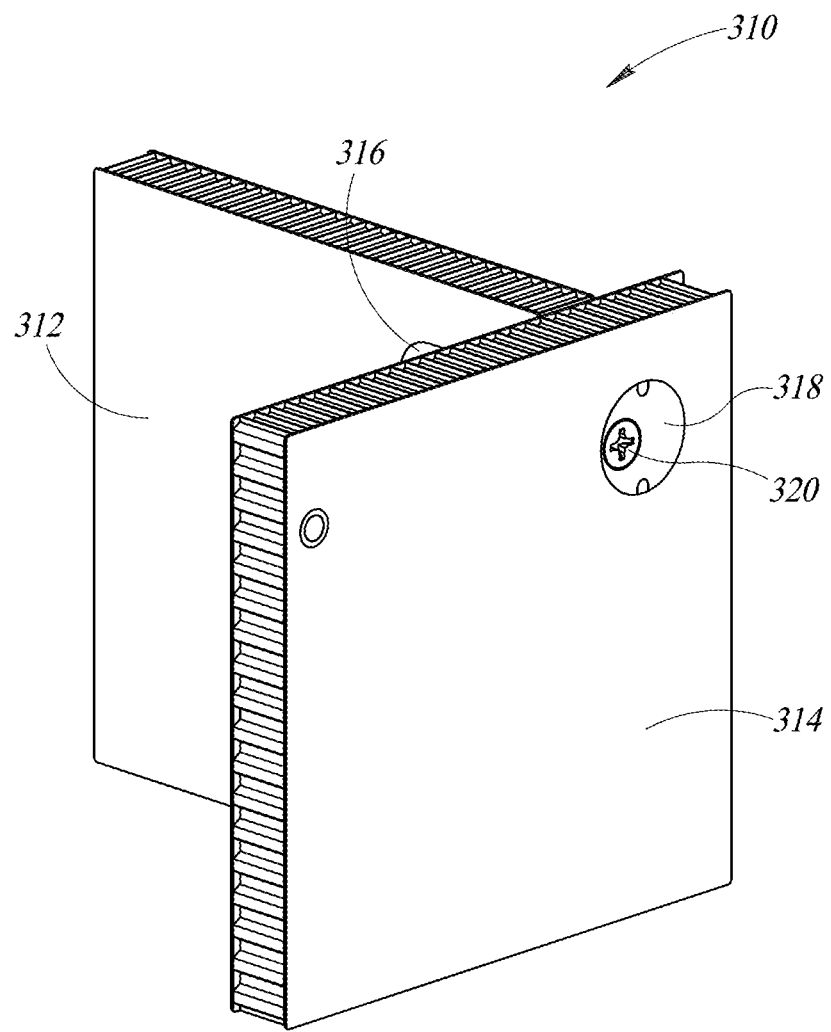
FIG. 13 is a perspective view of a panel assembly, according to one example implementation.

By way of example, FIG. 13 illustrates a panel assembly 310 according to one example implementation. The panel assembly 310 provides a variation in which a first panel 312 includes an elongated insert 316, which is generally similar to the elongated insert 16, and a second panel 314 includes a fastening insert 318, which is similar to the fastening insert 118. In this implementation, the fastening insert 318 is located distal from an edge of the second panel 314. Again, the first and second panels 312, 314 are coupled to each other via a fastener 320 which extends through the fastening insert 318 and is coupled to the elongated insert 316.

Although FIGS. 12-13 illustrate the panel assemblies 210, 310 that respectively form corner and T-joints via corresponding elongated inserts 216a, 216b and elongated insert 316 and fastening insert 318, in other implementations, corner joints of panel assemblies can be formed via elongated insert 616 coupled to a first panel and elongated insert 716 coupled to a second panel, with a fastener coupling the elongated inserts 616, 716. In some implementations, a corner joint can be formed via the fastening insert 1118 coupled to a first panel and the elongated insert 316 coupled to a second panel, with a fastener coupling the fastening insert 1118 and the elongated insert 316. In some implementations, a corner joint can be formed via the fastening insert 1318 coupled to a first panel and the elongated insert 916 coupled to a second panel, with a fastener coupling the elongated insert 916 and the fastening insert 1318. In such an implementation, the angular orientations of the shaft insert aperture 1352 and the insert aperture 941 can advantageously be sized and shaped to align in order to facilitate coupling capabilities in locations where access is limited and strength capabilities of the joint are compromised.

Similarly, T-joints of panel assemblies can be formed via fastening insert 218 coupled to a first panel and elongated insert 716 coupled to a second panel, with a fastener coupling the fastening insert 218 to the elongated insert 716. Again, in some implementations, a T-joint can be formed via the fastening insert 1318 coupled to a first panel and the elongated insert 916 coupled to a second panel, with a fastener coupling the elongated insert 916 and the fastening insert 1318.

In some implementations, co-planar joints of panel assemblies can be formed via fastening insert 816 coupled to a first panel and elongated insert 916 coupled to a second panel, with a fastener coupling the elongated insert 916 and the fastening insert 816. Again, the angular orientations of the insert aperture 941 and the insert aperture 841 can advantageously be sized and shaped to align in order to facilitate coupling capabilities in locations where access is limited and strength capabilities of the joint are compromised.

The various implementations described herein can be combined to provide further implementations. The modularity of the various implementations of the panel assemblies described herein can facilitate use thereof in a wide variety of applications. For instance, the panel assemblies and components thereof can be applied to rapidly construct various interior components of aircrafts, for example, floor panels, stowage compartment panels, etc. In other applications, the panel assemblies and components thereof can be used to construct enclosures by assembling a plurality of panel assemblies according to the various implementations of the panel assemblies described herein in a relatively cost-effective and quick manner. Such enclosures can, for example, be used in a wide variety of applications, such as for rapid deployment shelters, temporary construction sites, etc. For instance, a rapid deployment shelter can be constructed by assembling back, sides, front, and top wall structures. Each wall structure, i.e., back, sides, front, and top can be coupled to each other via the various implementations of the elongated inserts, fasteners, fastening inserts, etc., described herein. Moreover, the various implementations of the panel assemblies and components thereof described herein can enable rapid deployment and field use by enabling ease of portability. For instance, having the various implementations of elongated inserts (e.g., elongated inserts 16, 216a, 216b, 316, 416, 516, 616, 716, 816, 916, 1016, etc.) and fastening inserts (e.g., fastening inserts 18, 118, 218a, 218b, 318, 1118, 1218, 1318, 1418, 1518, 1618, etc.) configured to be installed flush on or in the various panels (e.g., panels 12, 14, 212, 214, 312, 314, etc.) can allow the various panels to be efficiently and compactly stacked without damage to the elongated inserts, fastening inserts, or other adjoining hardware, during transportation to the deployment sites.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An elongated insert capable of coupling panels of an aircraft panel assembly, the elongated insert comprising:
   a top side;
   a single web extending downwardly from the top side and extending to at least one peripheral edge of the top side, the single web including a pair of solid, cylindrical bosses that protrude outwardly therefrom; and
   a coupling side that is arranged to be positioned adjacent to a proximal side of one of the panels of the aircraft panel assembly.

2. The elongated insert of claim 1 wherein a first one of the pair of solid cylindrical bosses protrudes outwardly from the single web in a first direction and a second one of the pair of solid cylindrical bosses protrudes outwardly from the single web in a second direction, the second direction being opposite of the first direction.

3. The elongated insert of claim 1 wherein the top side includes a pair of apertures that extend therethrough, the apertures sized and shaped to allow potting compound to flow around a main body of the elongated insert.

4. The elongated insert of claim 1 wherein the coupling side includes an aperture that partially extends through the coupling side, the aperture sized and shaped to coupleably receive a fastener that is sized and shaped to couple the panels of the aircraft panel assembly.

5. The elongated insert of claim 1, further comprising:
   a bottom side having a surface area, wherein a surface area of the top side is larger than a surface area of the bottom side.

6. The elongated insert of claim 1, further comprising:
   one or more recesses which define a flow region around a main body of the elongated insert.

7. The elongated insert of claim 1, further comprising:
   flow regions around a main body of the elongated insert that are sized and shaped to receive potting compound which flows around the elongated insert, a flow of the potting compound around the main body coupling the elongated insert to one of the panels.

8. An elongated insert configured to be received in a panel of an aircraft panel assembly, the elongated insert comprising:
   a top side, the top side having a first surface area;
   a bottom side, the bottom side having a second surface area, the second surface area being less than the first surface area;
   a coupling side; and
   a web spanning the top side and the bottom side, the web extending to peripheral edges of the top side and the bottom side.

9. The elongated insert of claim 8 wherein the web includes a pair of solid, cylindrical bosses that protrude outwardly therefrom.

10. The elongated insert of claim 9 wherein a first one of the pair of solid cylindrical bosses protrudes outwardly from the web in a first direction and a second one of the pair of solid cylindrical bosses protrudes outwardly from the web in a second direction, the second direction being opposite of the first direction.

11. A fastening insert capable of coupling panels of an aircraft panel assembly, the fastening insert comprising
   a cap portion having a lower surface and a fastener aperture;
   a shaft portion having a threaded insert aperture, the fastener aperture and the threaded insert aperture defining a fastener receiving aperture which is sized and shaped to coupleably receive a fastener that is configured to couple the panels together via the fastening insert; and
   one or more gussets that extends between an outer surface of the shaft portion and the lower surface of the cap portion.

12. The fastening insert of claim 11, further comprising:
   one or more bosses protruding outwardly from the lower surface.

13. The fastening insert of claim 11 wherein the threaded insert aperture is sized and shaped to receive a threaded insert which receives the fastener that couples the panels together.

14. The fastening insert of claim 11 wherein the fastener receiving aperture is located at an offset relative to a central axis of the fastening insert.

15. The fastening insert of claim 11 wherein the cap portion includes a pair of openings disposed around a periphery of the cap portion, the pair of openings sized and shaped to receive a potting compound which flows one of the panels to bond the fastening insert received in one of the panels of the aircraft panel assembly.

* * * * *